(12) United States Patent
Hlopick et al.

(10) Patent No.: US 7,527,322 B2
(45) Date of Patent: May 5, 2009

(54) ALL TERRAIN VEHICLES HAVING STAY ASSEMBLY

(75) Inventors: Stephen Hlopick, Marysville, OH (US);
Darin D. King, Raymond, OH (US);
Daniel Thomas Sellars, West Liberty, OH (US); Matthew Alexander, Hilliard, OH (US); Scott Daniel Batdorf, Raymond, OH (US)

(73) Assignee: Honda Motor Company, Ltd., Tokyo (JP)

( * ) Notice: Subject to any disclaimer, the term of this patent is extended or adjusted under 35 U.S.C. 154(b) by 0 days.

(21) Appl. No.: 11/821,909

(22) Filed: Jun. 26, 2007

(65) Prior Publication Data

US 2009/0001704 A1 Jan. 1, 2009

(51) Int. Cl.
*B62D 27/00* (2006.01)
*B62D 25/16* (2006.01)

(52) U.S. Cl. .................. 296/181.1; 296/198; 296/29; 296/35.1; 296/181.2; 280/854; 280/154

(58) Field of Classification Search ............. 296/198, 296/191, 29, 35.1, 901.01, 181.2; 280/847, 280/848, 154, 851, 854, 152.1
See application file for complete search history.

(56) References Cited

U.S. PATENT DOCUMENTS

| | | | |
|---|---|---|---|
| 821,751 A | 5/1906 | Schmidt |
| 1,352,798 A | 9/1920 | Emery |
| 1,403,553 A | 1/1922 | Horn |
| 1,600,224 A | 9/1926 | Grundy |
| 1,958,678 A | 5/1934 | Place |
| 2,729,463 A | 1/1956 | Ludwig |
| 2,733,772 A | 2/1956 | Lamb |
| 2,908,311 A | 10/1959 | Garman |
| 3,217,772 A | 11/1965 | Adams |
| 3,261,422 A | 7/1966 | Jensen |
| 3,446,527 A | 5/1969 | Persson |
| 3,525,548 A | 8/1970 | Mutka |
| 3,809,427 A | 5/1974 | Bennett |
| 4,011,637 A | 3/1977 | Mazur |
| 4,030,773 A | 6/1977 | Meixner et al. |

(Continued)

OTHER PUBLICATIONS

Article entitled "Kawasaki KFX450 ATV Spy Photos," [online]. Known to be in the public domain prior to Jul. 27, 2006 [retrieved on Feb. 22, 2008]. Retrieved from the Internet: <URL: www.atvriders.com/atvnews/kawasakikfx450sportatvsspyphotos.html>.

(Continued)

*Primary Examiner*—Dennis H Pedder
(74) *Attorney, Agent, or Firm*—Ulmer & Berne LLP

(57) ABSTRACT

Vehicles, such as all terrain vehicles, can be provided with a frame and a fender assembly. The fender assembly can have layered fender panels attached together with a bolt and T-nut. A channel can be formed between the fender panels to facilitate passage of fluid along a predetermined pathway. A seat includes a compression surface for sandwiching the fender assembly with respect to the frame. Front and rear fender assemblies can be attached to the frame by a midpoint fastener passing through respective apertures in each of the front and rear fender assemblies, through a grommet, and into the frame. A stay assembly attaches a mudguard to the fender assembly, and can involve a swivel clip. Methods are also provided.

18 Claims, 27 Drawing Sheets

U.S. PATENT DOCUMENTS

| | | |
|---|---|---|
| 4,063,334 A | 12/1977 | Rohman |
| 4,198,092 A | 4/1980 | Federspiel |
| 4,268,052 A | 5/1981 | Sullivan |
| 4,447,067 A | 5/1984 | Yamashita |
| 4,535,869 A | 8/1985 | Tsutsumikoshi et al. |
| 4,705,422 A | 11/1987 | Tsui et al. |
| 4,781,258 A | 11/1988 | Tamura |
| 4,818,164 A | 4/1989 | Kazyak |
| 4,822,067 A | 4/1989 | Matsuo et al. |
| 4,913,256 A | 4/1990 | Sakuma |
| 4,982,973 A | 1/1991 | Saito et al. |
| 5,007,779 A | 4/1991 | Goran |
| 5,014,637 A | 5/1991 | Stevenson, IV |
| 5,022,804 A | 6/1991 | Peterson |
| 5,054,844 A | 10/1991 | Miwa |
| RE33,769 E | 12/1991 | Harrod |
| 5,090,105 A | 2/1992 | DeRees |
| 5,106,249 A | 4/1992 | Janotik |
| 5,108,129 A | 4/1992 | Olsen |
| D326,436 S | 5/1992 | Tamura et al. |
| 5,248,176 A | 9/1993 | Fredriksson |
| 5,301,997 A | 4/1994 | Cudden |
| D349,078 S | 7/1994 | Kimura et al. |
| 5,330,028 A | 7/1994 | Handa et al. |
| 5,340,154 A | 8/1994 | Scott |
| 5,342,106 A | 8/1994 | Fischer |
| 5,409,283 A | 4/1995 | Ban |
| 5,533,237 A | 7/1996 | Higgins |
| 5,536,125 A | 7/1996 | Gaw, Jr. |
| 5,542,158 A | 8/1996 | Gronau et al. |
| 5,573,300 A | 11/1996 | Simmons |
| 5,575,528 A | 11/1996 | Netz |
| 5,634,734 A | 6/1997 | Schron, Jr. et al. |
| D383,969 S | 9/1997 | Adams |
| 5,848,815 A | 12/1998 | Tsui et al. |
| 5,871,320 A | 2/1999 | Kovac |
| 5,876,085 A | 3/1999 | Hill |
| D412,464 S | 8/1999 | Ichihara et al. |
| 5,984,242 A | 11/1999 | Meyer |
| 6,016,943 A | 1/2000 | Johnson et al. |
| 6,019,403 A | 2/2000 | Corbett |
| 6,053,272 A | 4/2000 | Koyanagi et al. |
| D432,053 S | 10/2000 | Wu et al. |
| 6,129,370 A * | 10/2000 | Hsieh et al. .......... 280/291 |
| 6,131,284 A | 10/2000 | Basler |
| 6,164,885 A | 12/2000 | Roytberg et al. |
| D436,895 S | 1/2001 | Huang |
| D438,823 S | 3/2001 | Luh |
| D440,188 S | 4/2001 | Lin |
| D445,363 S | 7/2001 | Luh |
| 6,267,422 B1 | 7/2001 | Alba |
| D446,475 S | 8/2001 | Luh |
| 6,273,207 B1 | 8/2001 | Brown |
| D448,325 S | 9/2001 | Fujieda |
| 6,283,689 B1 | 9/2001 | Roytberg et al. |
| 6,315,250 B1 | 11/2001 | Meyer |
| 6,382,675 B1 | 5/2002 | Furuse et al. |
| 6,439,649 B1 | 8/2002 | Lorenzo et al. |
| 6,446,994 B1 * | 9/2002 | Smerdon, Jr. .......... 280/152.1 |
| 6,457,768 B1 | 10/2002 | Schroeder et al. |
| 6,493,920 B1 | 12/2002 | Hill et al. |
| 6,502,863 B1 | 1/2003 | Takahashi et al. |
| 6,520,275 B2 | 2/2003 | Galbraith et al. |
| 6,523,634 B1 | 2/2003 | Gagnon et al. |
| 6,533,055 B2 | 3/2003 | Matsuura et al. |
| 6,578,889 B2 | 6/2003 | Pearl |
| 6,588,536 B1 | 7/2003 | Chiu |
| 6,594,870 B1 | 7/2003 | Lambrecht et al. |
| 6,644,756 B1 | 11/2003 | Handa et al. |
| 6,659,701 B1 | 12/2003 | Risdale |
| D485,212 S | 1/2004 | Wu |
| D485,213 S | 1/2004 | Wu |
| 6,682,085 B2 | 1/2004 | Furuhashi et al. |
| 6,736,434 B2 | 5/2004 | Anderson et al. |
| 6,761,241 B2 | 7/2004 | Kohda |
| 6,769,850 B2 | 8/2004 | Lay |
| 6,805,214 B2 | 10/2004 | Maeda et al. |
| 6,874,590 B2 | 4/2005 | Rondeau et al. |
| 6,892,842 B2 | 5/2005 | Bouffard et al. |
| 6,913,099 B2 | 7/2005 | Scott |
| 6,918,627 B2 | 7/2005 | Mataja et al. |
| D508,667 S | 8/2005 | Sugimoto |
| 6,923,282 B2 | 8/2005 | Chernoff et al. |
| D511,318 S | 11/2005 | Sugimoto |
| D512,001 S | 11/2005 | Kato et al. |
| 7,000,318 B2 | 2/2006 | Chernoff et al. |
| 7,001,128 B2 | 2/2006 | Kuntze |
| D516,466 S | 3/2006 | Nakazawa et al. |
| D518,423 S | 4/2006 | Tandrup et al. |
| 7,036,837 B1 | 5/2006 | Bauer et al. |
| 7,044,527 B2 | 5/2006 | Maeda et al. |
| D522,410 S | 6/2006 | Lin |
| 7,055,889 B2 | 6/2006 | Mataja et al. |
| 7,086,691 B2 | 8/2006 | Kennedy et al. |
| 7,093,684 B2 | 8/2006 | Scott |
| 7,097,207 B2 | 8/2006 | Kudo et al. |
| 7,104,581 B2 | 9/2006 | Chernoff et al. |
| 7,118,138 B1 | 10/2006 | Rowley et al. |
| 7,124,844 B2 | 10/2006 | Bourgeois et al. |
| 7,287,797 B1 | 10/2007 | Bellioso |
| 7,331,593 B2 | 2/2008 | Okabe et al. |
| 7,438,350 B1 | 10/2008 | Peterson et al. |
| 2003/0116937 A1 * | 6/2003 | Blythe .......... 280/152.1 |
| 2004/0134952 A1 | 7/2004 | Crepeau et al. |
| 2004/0188156 A1 | 9/2004 | Karube et al. |
| 2004/0207190 A1 | 10/2004 | Nakagawa et al. |
| 2004/0241335 A1 | 12/2004 | Motzko et al. |
| 2006/0048993 A1 | 3/2006 | Karube et al. |
| 2006/0131827 A1 | 6/2006 | Benedict et al. |
| 2006/0278462 A1 | 12/2006 | Kotrla |

OTHER PUBLICATIONS

Webpage photo depicting ATV fender, and believed to represent a Polaris Outlaw ATV [online]. Known to be in the public domain prior to Jul. 27, 2006. Retrieved from the Internet: <URL: www.off-road.com>.

U.S. Appl. No. 11/821,972, Titled: All Terrain Vehicle Having Layered Body Panel Configuration, filed Jun. 26, 2007, Inventors: Anthony M. Schroeder et al., in its entirety.

U.S. Appl. No. 11/821,970, Titled: Panel Assemblies, Vehicles, and Methods of Manufacturing, filed Jun. 26, 2007, Inventors: Darin D. King et al., in its entirety.

U.S. Appl. No. 11/821,964, Titled: All Terrain Vehicles and Fender Assemblies Therefor, filed Jun. 26, 2007, Inventors: Stephen Hlopick et al., in its entirety.

U.S. Appl. No. 11/823,065, Titled: All Terrain Vehicles Having Fender Assembly, filed Jun. 26, 2007, Inventors: Stephen Hlopick et al., in its entirety.

U.S. Appl. No. 11/821,959, Titled: All Terrain Vehicles Having Seat With Compression Surface, filed Jun. 26, 2007, Inventors: Shinichi Karube et al., in its entirety.

U.S. Appl. No. 11/821,922, Titled: All Terrain Vehicles Having Midpoint Fastener and Methods, filed Jun. 26, 2007, Inventors: Michael V. Peterson et al., in its entirety.

U.S. Appl. No. 11/821,921, Titled: Vehicles Having Fastener Extending Into Apertures of Respective Body Panels and Methods, filed Jun. 26, 2007, Inventors: Michael V. Peterson et al., in its entirety.

U.S. Appl. No. 11/821,963, Titled: All Terrain Vehicles Having Swivel Clip and Methods, filed Jun. 26, 2007, Inventors: Stephen Hlopick et al., in its entirety.

Dennis H. Pedder, Official Action, Notification date of Aug. 18, 2008, U.S. Appl. No. 11/821,972, Titled: All Terrain Vehicle Having Layered Body Panel Configuration, filed Jun. 26, 2007, Inventor: Anthony Schroeder et al., 6 pages.

Dennis H. Pedder, Official Action, Notification date of Aug. 18, 2008, U.S. Appl. No. 11/821,970, Titled: Panel Assemblies, Vehicles, and Methods of Manufacturing, filed Jun. 26, 2007, Inventor: Darin D. King et al., 5 pages.

Dennis H. Pedder, Official Action, Notification date of Aug. 18, 2008, U.S. Appl. No. 11/821,964, Titled: All Terrain Vehicles and Fender Assemblies Therefor, filed Jun. 26, 2007, Inventor: Stephen Hlopick et al., 6 pages.

Dennis H. Pedder, Official Action, Notification date of Aug. 18, 2008, U.S. Appl. No. 11/823,065, Titled: All Terrain Vehicles Having Fender Assembly, filed Jun. 26, 2007, Inventor: Stephen Hlopick et al., 6 pages.

Dennis H. Pedder, Official Action, Notification date of Sep. 23, 2008, U.S. Appl. No. 11/821,959, Titled: All Terrain Vehicles Having Seat With Compression Surface, filed Jun. 26, 2007, Inventor: Shinichi Karube et al., 5 pages.

Dennis H. Pedder, Official Action, Notification date of Aug. 15, 2008, U.S. Appl. No. 11/821,972, Titled: All Terrain Vehicles Having Midpoint Fastener and Methods, filed Jun. 26, 2007, Inventor: Michael V. Peterson et al., 6 pages.

Dennis H. Pedder, Notice of Allowance, Mailed on Aug. 18, 2008, U.S. Appl. No. 11/821,921, Titled: Vehicles Having Fastener Extending Into Apertures of Respective Body Panels and Methods, filed Jun. 26, 2007, Inventor: Michael V. Peterson et al., 6 pages.

Dennis H. Pedder, Official Action, Notification date of Aug. 18, 2008, U.S. Appl. No. 11/821,963, Titled: All Terrain Vehicles Having Swivel Clip and Methods, filed Jun. 26, 2007, Inventor: Stephen Hlopick et al., 6 pages.

International Search Report and Written Opinion of the International Searching Authority, International Application No. PCT/US07/16706, mailed on Sep. 17, 2008, 10 pages.

Dennis H. Pedder, Official Action and PTO-892, Notification date of Dec. 17, 2008, U.S. Appl. No. 11/821,972, Titled: All Terrain Vehicle Having Layered Body Panel Configuration, filed Jun. 26, 2007, Inventor: Anthony Schroeder et al., 9 pages.

Dennis H. Pedder, Official Action and PTO-892, Notification date of Dec. 22, 2008, U.S. Appl. No. 11/821,970, Titled: Panel Assemblies, Vehicles, and Methods of Manufacturing, filed Jun. 26, 2007, Inventor: Darin D. King et al., 6 pages.

Dennis H. Pedder, Official Action, Notification date of Dec. 17, 2008, U.S. Appl. No. 11/821,964, Titled: All Terrain Vehicles and Fender Assemblies Therefor, filed Jun. 26, 2007, Inventor: Stephen Hlopick et al., 8 pages.

Dennis H. Pedder, Notice of Allowance and PTO-892, Mailed on Dec. 18, 2008, U.S. Appl. No. 11/823,065, Titled: All Terrain Vehicles Having Fender Assembly, filed Jun. 26, 2007, Inventor: Stephen Hlopick et al., 5 pages.

Dennis H. Pedder, Official Action and PTO-892, Notification date of Dec. 17, 2008, U.S. Appl. No. 11/821,922, Titled: All Terrain Vehicles Having Midpoint Fastener and Methods, filed Jun. 26, 2007, Inventor: Michael V. Peterson et al., 8 pages.

Dennis H. Pedder, Official Action, Notification date of Dec. 12, 2008, U.S. Appl. No. 11/821,963, Titled: All Terrain Vehicles Having Swivel Clip and Methods, filed Jun. 26, 2007, Inventor: Stephen Hlopick et al., 6 pages.

* cited by examiner

ALL TERRAIN VEHICLES HAVING STAY ASSEMBLY

REFERENCE TO RELATED APPLICATIONS

The present application is related to U.S. patent application Ser. Nos. 11/821,972, 11/821,970, 11/821,964, 11/823,065, 11/821,959, 11/821,922, 11/821,921 and 11/821,963, each filed on Jun.26, 2007, and respectively entitled "All Terrain Vehicle Having Layered Body Panel Configuration," "Panel Assemblies, Vehicles, And Methods Of Manufacturing," "All Terrain Vehicles And Fender Assemblies Therefor," "All Terrain Vehicles Having Fender Assembly," "All Terrain Vehicles Having Seat With Compression Surface," "All Terrain Vehicles Having Midpoint Fastener And Methods," "Vehicles Having Fastener Extending Into Apertures Of Respective Body Panels And Methods," and "All Terrain Vehicles Having Swivel Clip And Methods." The entirety of each of these U.S. patent applications is hereby incorporated herein by reference.

TECHNICAL FIELD

The present invention relates to vehicles such as, for example, all terrain vehicles ("ATVs"), as well as methods for making vehicles. The present invention also relates to components and assemblies such as for use upon vehicles such as ATVs.

BACKGROUND

A conventional body for an ATV can be formed as a panel from a single piece of material, such as from plastic or fiberglass. Such an ATV body can include wheel fenders, side panels, a gas tank cover, and other features. As such, an ATV body can be quite large in size, making it difficult and expensive to effectively and efficiently manufacture. In particular, it can be difficult to manufacture such a large component from plastic (e.g., due to injection molding limitations), though plastic is often the material of choice for manufacturing a body for an ATV.

Also, since a conventional body for an ATV is often formed as a single component, any damage to the body during use of the ATV can require costly replacement parts as well as significant labor. Likewise, in order to service the engine or other components of the ATV, it may be necessary to remove the body which can be difficult and time consuming.

Manufacturers of ATVs must often stock different colors of bodies for a given ATV in order to provide a selection to customers. However, as conventional bodies for ATVs are relatively large, stocking different colors can be expensive and may require large volumes of warehouse space.

Wheel fenders on conventional ATVs are typically attached to the frame through use of stay structures. For example, as shown in FIG. 13, a rear fender assembly 556 of a conventional ATV includes a rear fender panel 561 which is attached to a frame 541 of the ATV through use of a stay 557. The stay 557 is formed from spring-type steel, and is attached to a leg 503 depending from a lower surface of the rear fender panel 561. The rear fender panel 561 is also shown to be bolted directly to the frame 541 at an attachment location concealed by a seat 596. The seat 596 is configured for supporting an operator of the ATV. The stay 557 helps an outer perimeter 563 of the rear fender panel 561 to resist vertical deflection, and accordingly provides at least some stiffness and rigidity to the rear fender panel 561 with respect to the frame 541. However, as the stay is separate from the rear fender panel 561, manufacturing and installation of the stay 557 can be time-consuming and expensive. Also, the stay 557 is aesthetically unattractive and can be prone to snagging upon debris. Because the supporting force of the stay is localized to the leg 503 of the rear fender panel 561, damage to the leg 503 and/or other portions of the rear fender panel 561 can arise due to stresses from repeated vertical deflection of the outer perimeter 563 of the rear fender panel 561.

A conventional ATV also includes mudguards 512 and 513 which can be supported with respect to a frame of the ATV through use of a stay assembly 520, as shown in FIG. 33. The stay assembly 520 includes elongated metal wires 522 and 524 which are formed from spring-type steel. The elongated metal wires 522 and 524 are configured to attach the mudguard 512 to the ATV's frame. In particular, bolts 530, 532, 534, 536 and corresponding swivel clips 529, 531, 533, and 535 are provided to attach the elongated metal wires 522 and 524 to the mudguard 512. An end 525 of the elongated metal wire 524 is bent to receive a bolt 568 to facilitate attachment of the end 525 to the ATV's frame. The opposite end of the elongated metal wire 524 is configured to slidably engage a frame-mounted footrest (not shown). An end 542 of the elongated metal wire 522 is bent to receive a bolt 543 to facilitate attachment of the end 542 to the footrest. The opposite end 540 of the elongated metal wire 522 is attachable to the mudguard 512 through use of the bolt 532 and swivel clip 531. A similar arrangement of elongated metal wires, bolts, and swivel clips is shown for attachment of the mudguard 513 to the ATV's frame. Another elongated metal wire 526 is separate from the stay assembly 520 and extends between respective ends 527 and 528. The end 527 attaches to a lower end of a left rear fender panel 558, while the end 528 attaches to a lower end of a right rear fender panel 559. The elongated metal wire 526 is also attached to the ATV's seat through use of brackets 538 and 539. It can be seen in FIG. 33 that the arrangement of elongated metal wires is complex, costly, unsightly, and time consuming to install.

Conventional ATVs are often manufactured in such a manner that an operator's seat is first attached to a fender assembly, and the fender assembly is subsequently attached to the ATV's frame. Attachment of the fender assembly to the ATV's frame can accordingly be complicated and time consuming, and access to components of the ATV underlying the seat and/or other portions of the ATV can be difficult.

SUMMARY OF THE INVENTION

In accordance with one embodiment, an all terrain vehicle comprises a frame, a first wheel, a second wheel, a first fender panel, and a second fender panel. The first wheel and the second wheel are each supported with respect to the frame. The first fender panel is attached to the frame and extends at least partially over each of the first wheel and the second wheel. The second fender panel at least partially covers the first fender panel and extends at least partially over each of the first wheel and the second wheel.

In accordance with another embodiment, an all terrain vehicle comprises a frame, a plurality of wheels supported with respect to the frame, a first panel, and a second panel. The first panel is attached to the frame and has a first top surface and a first bottom surface. A portion of the first top surface provides a decorative body surface for the all terrain vehicle. The first panel continuously extends from a left side of the all terrain vehicle to a right side of the all terrain vehicle and extends over at least two of the wheels. The first bottom surface is positioned to receive contact from debris thrown by said at least two of the wheels. The second panel is removably attached to the first panel and has a second top surface and a second bottom surface. At least a portion of the second top surface provides a decorative body surface for the all terrain vehicle. A portion of the second bottom surface is adjacent to at least a portion of the first top surface. Another portion of the second bottom surface is positioned to receive contact from debris thrown by at least one of the wheels.

In accordance with yet another embodiment, an all terrain vehicle comprises a frame, a plurality of wheels supported with respect to the frame, a first fender panel, and a second fender panel. The first fender panel is attached to the frame and has a first top surface and a first bottom surface. The first bottom surface is positioned to receive contact from debris thrown by at least one of the wheels. The second fender panel is attached with respect to the first panel and has a second top surface and a second bottom surface. A portion of the second bottom surface is adjacent to at least a portion of the first top surface. Another portion of the second bottom surface is positioned to receive contact from debris thrown by said at least one of the wheels.

In accordance with still another embodiment, a panel assembly comprises a first panel, a T-nut, a second panel, and a bolt. The first panel defines an aperture. The T-nut comprises a base portion and a neck portion. The neck portion defines a threaded aperture. The second panel comprises a pocket which defines an opening extending through the second panel. The pocket is configured to receive the base portion of the T-nut in a snap-fit arrangement such that the neck portion of the T-nut extends into the opening. The bolt is configured for insertion into the aperture in the first panel and into the threaded aperture in the T-nut to facilitate attachment of the first panel to the second panel.

In accordance with yet another embodiment, a panel comprises a pocket. The pocket defines an opening extending through the panel. The pocket is configured to receive a base portion of a T-nut in a snap-fit arrangement such that a neck portion of the T-nut extends into the opening.

In accordance with yet another embodiment, a vehicle comprises a first body panel, a T-nut, a second body panel, and a bolt. The first body panel defines an aperture. The T-nut comprises a base portion and a neck portion. The neck portion defines a threaded aperture. The second body panel comprises a pocket. The pocket defines an opening extending through the second body panel. The pocket is configured to receive the base portion of the T-nut in a snap-fit arrangement such that the neck portion of the T-nut extends into the opening. The bolt is configured for insertion into the aperture in the first body panel and into the threaded aperture in the T-nut to facilitate attachment of the first body panel to the second body panel.

In accordance with another embodiment, an all terrain vehicle comprises a first plastic fender panel, a T-nut, a second plastic fender panel, and a bolt. The first plastic fender panel defines an aperture. The T-nut comprises a base portion and a neck portion. The neck portion defines a threaded aperture. The second plastic fender panel comprises a pocket. The pocket defines an opening extending through the second body panel. The pocket is configured to receive the base portion of the T-nut in a snap-fit arrangement such that the neck portion of the T-nut extends into the opening. The bolt is configured for insertion into the aperture in the first body panel and into the threaded aperture in the T-nut to facilitate attachment of the first body panel to the second body panel.

In accordance with yet another embodiment, a method of manufacturing a vehicle comprises providing first and second body panels in at least a partially overlapping arrangement. The first body panel defines an aperture, the second body panel defines a pocket, and the pocket defines an opening extending through the second panel. A T-nut is inserted into the pocket in a snap-fit arrangement such that a neck portion of the T-nut extends into the opening in the second body panel. The first body panel is attached to the second body panel by inserting a bolt into the aperture in the first body panel and into a threaded aperture in the neck portion of the T-nut.

In accordance with still another embodiment, an all terrain vehicle comprises a frame, a wheel supported with respect to the frame, and a fender assembly. The fender assembly comprises a lower fender panel and an upper fender panel. The upper fender panel at least partially overlaps the lower fender panel. A portion of the upper fender panel cooperates with a portion of the lower fender panel in a spaced relationship to define both an access opening and a channel. The channel at least partially overlies the wheel and is configured to facilitate passage of fluid along a predetermined pathway from the access opening to a predetermined egress opening.

In accordance with still another embodiment, a fender assembly is provided for an all terrain vehicle. The fender assembly comprises a lower fender panel and an upper fender panel. The upper fender panel is configured for attachment to the lower fender panel in a partially overlapping relationship such that a portion of the upper fender panel cooperates with a portion of the lower fender panel in a spaced relationship to define both an access opening and a channel. The channel is configured to facilitate passage of fluid along a predetermined pathway from the access opening to a predetermined egress opening.

In accordance with yet another embodiment, an all terrain vehicle comprises a frame, a left wheel supported with respect to the frame, a right wheel supported with respect to the frame, and a fender assembly. The fender assembly comprises a lower fender panel and an upper fender panel. The upper fender panel at least partially overlaps the lower fender panel. A left portion of the upper fender panel cooperates with a left portion of the lower fender panel in a spaced relationship to define both a left access opening and a left channel. The left channel at least partially overlies the left wheel and is configured to facilitate passage of fluid along a left predetermined pathway from the left access opening to a predetermined egress opening. A right portion of the upper fender panel cooperates with a right portion of the lower fender panel in a spaced relationship to define both a right access opening and a right channel. The right channel at least partially overlies the right wheel and is configured to facilitate passage of fluid along a right predetermined pathway from the right access opening to a predetermined egress opening.

In accordance with another embodiment, an all terrain vehicle comprises a frame, a wheel supported with respect to the frame, and a fender assembly. The fender assembly comprises a lower fender panel and an upper fender panel. The lower fender panel has a first top surface and a first bottom surface and extends from a first inner end to a first outer end. The first inner end is attached to the frame. The first bottom surface is positioned to receive contact from debris thrown by the wheel. The upper fender panel has a second top surface and a second bottom surface and extends from a second inner end to a second outer end. The second inner end is attached to the frame. The upper fender panel is attached to the lower fender panel at an attachment location adjacent to at least one of the first outer end and the second outer end. The second bottom surface is positioned to receive contact from debris thrown by the wheel. Each of the lower fender panel and the upper fender panel extends at least partially over the wheel.

The lower fender panel and the upper fender panel cooperate to facilitate resistance of the attachment location to vertical deflection.

In accordance with yet another embodiment, an all terrain vehicle comprises a frame, a wheel supported with respect to the frame, and a fender assembly. The fender assembly comprises a lower fender panel and an upper fender panel. The lower fender panel extends from a first inner end to a first outer end. The upper fender panel extends from a second inner end to a second outer end. The upper fender panel is attached to the lower fender panel at an attachment location adjacent to at least one of the first outer end and the second outer end. Each of the lower fender panel and the upper fender panel extends at least partially over the wheel. A portion of the upper fender panel cooperates with a portion of the lower fender panel in a spaced relationship to define both an access opening and a channel. The channel at least partially overlies the wheel and is disposed between the first inner end and the attachment location. The channel is configured to facilitate passage of fluid along a predetermined pathway from the access opening to a predetermined egress opening. The lower fender panel and the upper fender panel cooperate to support the attachment location with respect to the frame to facilitate resistance of the attachment location to vertical deflection.

In accordance with still another embodiment, an all terrain vehicle comprises a frame, a left wheel supported with respect to the frame, a right wheel supported with respect to the frame, and a fender assembly. The fender assembly comprises a lower fender panel and an upper fender panel. The lower fender panel extends from a first inner end to a first outer end. The first inner end is attached to the frame. The upper fender panel extends from a second inner end to a second outer end. The second inner end is attached to the frame. The upper fender panel is attached to the lower fender panel at an attachment location adjacent to at least one of the first outer end and the second outer end. Each of the lower fender panel and the upper fender panel extends at least partially over each of the left wheel and the right wheel. The lower fender panel and the upper fender panel cooperate to support the attachment location to facilitate resistance of the attachment location to vertical deflection.

In accordance with yet another embodiment, an all terrain vehicle comprises a frame, a rear wheel, a fender assembly, a footrest, a mudguard, and a stay assembly. The rear wheel is supported with respect to the frame. The fender assembly extends at least partially over the rear wheel. The stay assembly comprises a first elongated metal wire and a second elongated metal wire. Each of the first elongated metal wire and the second elongated metal wire are attached to each of the frame, the fender assembly, the footrest, and the mudguard.

In accordance with yet another embodiment, an all terrain vehicle comprises a frame, a fender assembly, a mudguard, and an elongated metal wire attached to each of the frame, the fender assembly, and the mudguard. The elongated metal wire is configured to facilitate consistent spacing between the mudguard and the fender assembly.

In accordance with still another embodiment, an all terrain vehicle comprises a frame, a fender assembly, a mudguard, and a stay assembly attached to each of the frame, the fender assembly, and the mudguard.

In accordance with still another embodiment, an all terrain vehicle comprises a frame, a wheel, a fender assembly, and a seat. The wheel is supported with respect to the frame. The fender assembly extends at least partially over the wheel and comprises an inside edge portion. The seat comprises a compression surface and is configured for selective attachment to the frame. The compression surface is configured, upon attachment of the seat to the frame, to contact and sandwich the inside edge portion of the fender assembly between the compression surface and the frame.

In accordance with yet another embodiment, an all terrain vehicle comprises a frame, a wheel, a fender assembly, and a seat. The wheel is supported with respect to the frame. The fender assembly comprises an upper fender panel and a lower fender panel which each extend at least partially over the wheel. The upper fender panel comprises an upper inside edge portion. The lower fender panel comprises a lower inside edge portion. The upper inside edge portion overlaps the lower inside edge portion. The seat comprises a compression surface and is configured for selective attachment to the frame. The compression surface is configured, upon attachment of the seat to the frame, to contact the upper inside edge portion and to sandwich both the upper inside edge portion and the lower inside edge portion between the compression surface and the frame.

In accordance with another embodiment, an all terrain vehicle comprises a frame, a left wheel, a right wheel, a fender assembly, and a seat. Each of the left wheel and the right wheel are supported with respect to the frame. The fender assembly comprises a left upper fender panel, a left lower fender panel, a right upper fender panel, and a right lower fender panel. The left upper fender panel and the left lower fender panel each extend at least partially over the left wheel. The right upper fender panel and the right lower fender panel each extend at least partially over the right wheel. The left upper fender panel comprises a left upper inside edge portion. The left lower fender panel comprises a left lower inside edge portion. The left upper inside edge portion overlaps the left lower inside edge portion. The right upper fender panel comprises a right upper inside edge portion. The right lower fender panel comprises a right lower inside edge portion. The right upper inside edge portion overlaps the right lower inside edge portion. The seat comprises a left compression surface and a right compression surface and is configured for selective attachment to the frame. The seat is configured, upon attachment of the seat to the frame, such that the left compression surface contacts the left upper inside edge portion to sandwich both the left upper inside edge portion and the left lower inside edge portion between the left compression surface and the frame, and such that the right compression surface contacts the right upper inside edge portion to sandwich both the right upper inside edge portion and the right lower inside edge portion between the right compression surface and the frame.

In accordance with yet another embodiment, an all terrain vehicle comprises a frame, a front fender assembly, a rear fender assembly, and a midpoint fastener. The frame extends from a forward end to a rearward end. The frame comprises a forward attachment structure disposed adjacent to the forward end, a rearward attachment structure disposed adjacent to the rearward end, and a midpoint attachment structure disposed about midway between the forward end and the rearward end. The front fender assembly is attached to each of the forward attachment structure and the midpoint attachment structure and extends at least partially over a front wheel. The rear fender assembly is attached to each of the midpoint attachment structure and the rearward attachment structure and extends at least partially over a rear wheel. The midpoint fastener is inserted into first aligning apertures defined by each of the front fender assembly, the rear fender assembly, and the midpoint attachment structure.

In accordance with still another embodiment, a method of assembling an all terrain vehicle comprising providing a frame extending from a forward end to a rearward end. The frame comprises a forward attachment structure disposed adjacent to the forward end, a rearward attachment structure disposed adjacent to the rearward end, and a midpoint attachment structure disposed about midway between the forward end and the rearward end. A front fender assembly is attached to each of the forward attachment structure and the midpoint attachment structure such that the front fender assembly is configured to extend at least partially over a front wheel. A rear fender assembly is attached to each of the midpoint attachment structure and the rearward attachment structure such that the rear fender assembly is configured to extend at least partially over a rear wheel. A midpoint fastener is inserted into first aligning apertures defined by each of the front fender assembly, the rear fender assembly, and the midpoint attachment structure.

In accordance with still another embodiment, a vehicle comprises a frame, a first body panel, a second body panel, a sleeve, a grommet, and a fastener. The frame defines a threaded aperture. The first body panel defines a first aperture. The second body panel defines a second aperture. The sleeve defines a longitudinally extending sleeve bore. The sleeve extends into the first aperture in the first body panel. The grommet has a grommet exterior surface and defines a grommet bore extending longitudinally from a first end to a second end. The grommet bore surrounds the sleeve. The grommet exterior surface defines an annular channel having a reduced diameter as compared to longitudinally adjacent annular portions of the grommet disposed upon opposite sides of the annular channel. One of the longitudinally adjacent annular portions defines the first end, while the other of the longitudinally adjacent annular portions defines the second end. The second aperture surrounds the annular channel such that a portion of the second body panel is retained within the annular channel. The first end contacts the first body panel adjacent to the first aperture. The fastener extends through the first aperture and the sleeve bore and into the threaded aperture in the frame. The fastener is configured to compress the grommet between the first body panel and the frame.

In accordance with yet another embodiment, a vehicle comprises a frame, a first body panel, a second body panel, a fastener, and a grommet. The frame defines a threaded aperture. The first body panel defines a first aperture. The second body panel defines a second aperture. The first body panel at least partially overlaps the second body panel such that the first aperture aligns with the second aperture. The fastener extends into each of the first aperture, the second aperture, and the threaded aperture to facilitate attachment of the first body panel and the second body panel to the frame. The grommet surrounds a portion of the fastener. The grommet is disposed between the first body panel and the second body panel to prevent the first body panel from contacting the second body panel adjacent to the fastener. The grommet is disposed between the second body panel and the frame to prevent the second body panel from contacting the frame adjacent to the fastener.

In accordance with yet another embodiment, a method of assembling a vehicle comprises overlapping respective first and second body panels such that a first aperture in the first body panel aligns with a second aperture in a second body panel. A grommet is disposed between a portion of the first body panel adjacent to the first aperture and a portion of the second body panel adjacent to the second aperture. The grommet is additionally disposed between a frame and a portion of the second body panel adjacent to the second aperture. The grommet defines a grommet bore. A sleeve is inserted through the grommet bore. The sleeve defines a sleeve bore which aligns with the first aperture and the second aperture. A fastener is inserted into the first aperture, the sleeve bore, and a threaded aperture in the frame to facilitate attachment of the first body panel and the second body panel to the frame.

In accordance with another embodiment, an all terrain vehicle comprises a frame, a body panel, an elongated metal wire, and a ribbon. The elongated metal wire is attached to the body panel and has a longitudinal portion. The ribbon extends from a first end to a second end. The ribbon at least partially surrounds the longitudinal portion of the elongated metal wire such that the first end overlaps the second end. The first end and the second end are attached to the frame such that the elongated metal wire is movably attached to the frame by the ribbon.

In accordance with yet another embodiment, an all terrain vehicle comprises a frame, a fender assembly, a mudguard, an elongated metal wire, and a swivel clip. The elongated metal wire has a longitudinal portion. The elongated metal wire is attached to the fender assembly and the mudguard on opposite sides of the longitudinal portion. The swivel clip comprises a retention portion and a mounting portion. The retention portion at least partially surrounds the longitudinal portion of the elongated metal wire. The mounting portion is attached to the frame such that the elongated metal wire is movably attached to the frame.

In accordance with yet another embodiment, a method of attaching a body panel to a frame of an all terrain vehicle comprises attaching an elongated metal wire to a body panel. A ribbon is wrapped at least partially around a longitudinal portion of the elongated metal wire. Respective apertures are aligned in respective ends of the ribbon. A fastener is inserted through the respective apertures in the ribbon and into another aperture provided in the frame of the all terrain vehicle to facilitate movable attachment of the elongated metal wire with respect to the frame of the all terrain vehicle.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 37 is a front perspective view depicting an upper front fender panel and an upper rear fender panel in exploded association with the components of FIGS. 36-36a;

DETAILED DESCRIPTION

Embodiments are hereinafter described in detail in connection with the views and examples of FIGS. 1-12, 14-32, 34-36, 36a, 37-38 and 38a, wherein like numbers may indicate the same or corresponding elements throughout the views. Certain embodiments will be described herein with reference to an ATV. It will be appreciated that an ATV can comprise a saddle-type vehicle suitable for off-road, sport and/or utility use by a driver and perhaps one or more passengers. Although many of the examples provided herein relate to an ATV, it will be appreciated that certain embodiments may also have applicability to other types of vehicles such as, for example, automobiles, trucks, vans, personal watercraft, aircraft, motorcycles, boats, toys, and construction equipment, for example.

Figure 1:
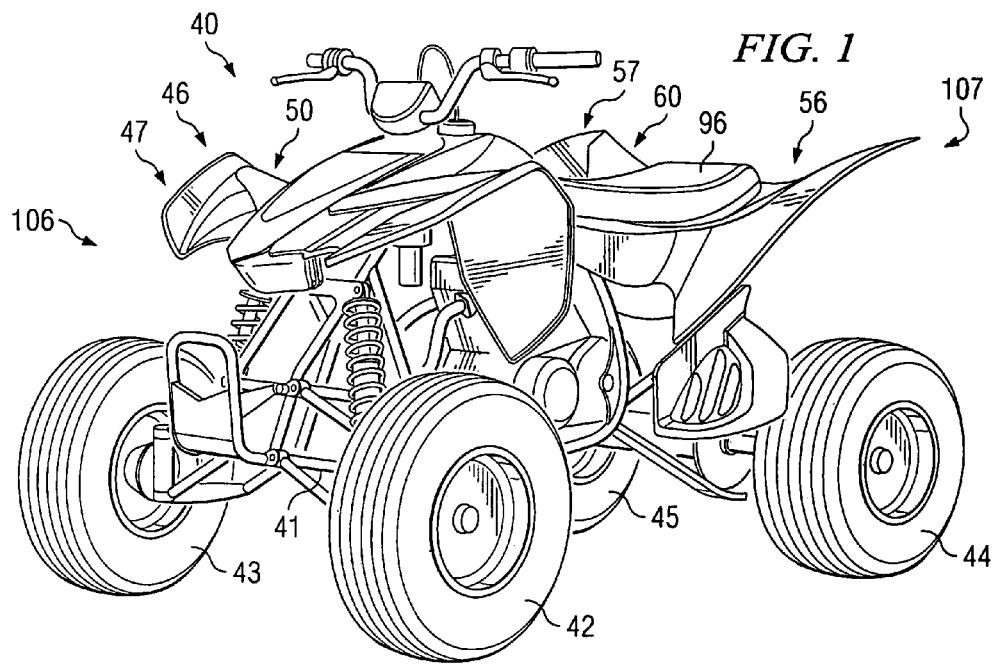
FIG. 1 is a front perspective view depicting an ATV in accordance with one embodiment.
Figure 2:
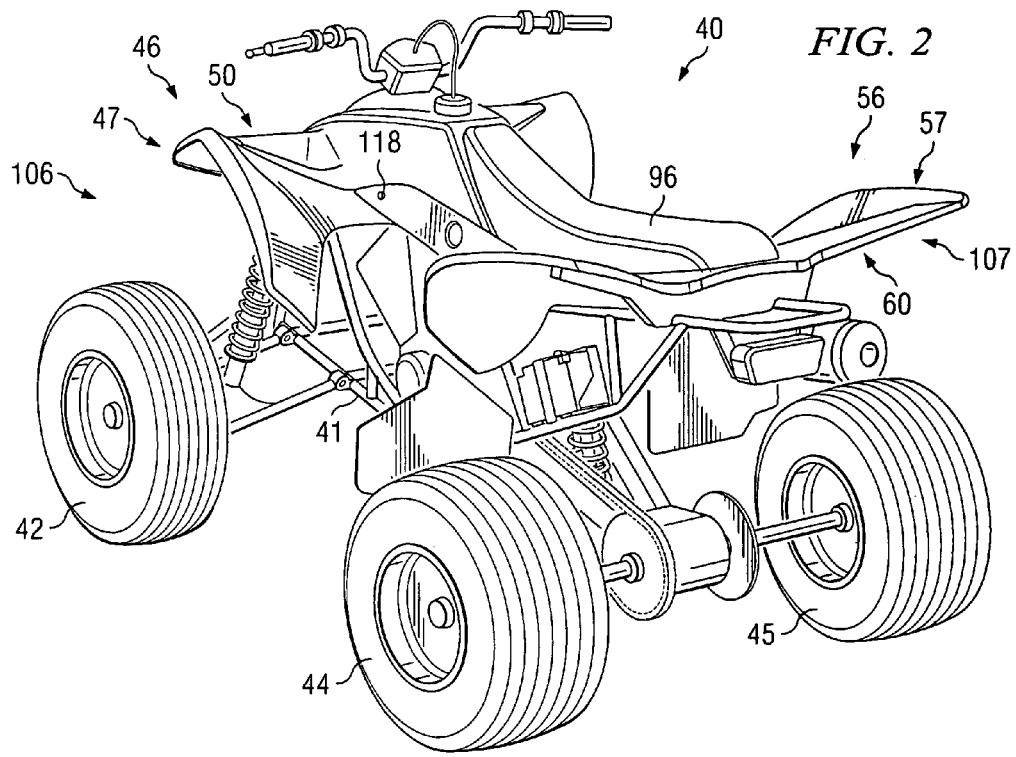
FIG. 2 is a rear perspective view depicting the ATV of FIG. 1.

In one embodiment, such as that depicted in FIGS. 1-2, for example, an ATV 40 can comprise four wheels supported with respect to a frame 41 of the ATV 40. In particular, the ATV 40 is shown to comprise a left front wheel 42, a right front wheel 43, a left rear wheel 44 and a right rear wheel 45. However, in alternative embodiments, an ATV can comprise a differing numbers of wheels. For example, an ATV might comprise a total of three wheels, wherein one wheel is a front wheel and the remaining two wheels are rear wheels. As another example, an ATV might comprise a total of five wheels, wherein one wheel is a front wheel and the remaining four wheels are rear wheels in a tandem axle configuration. In still another example, an ATV might comprise a total of six wheels, wherein two wheels are front wheels and the remaining four wheels are rear wheels in a tandem axle configuration.

Regardless of the number of wheels provided upon an ATV, the ATV can include a fender assembly. The fender assembly can be configured to prevent debris from being thrown from the ATV's wheels and upon an operator and/or passenger(s) of an ATV during travel of the ATV. Such debris might include, for example, dirt, brush, rocks, or moisture. In one embodiment, the fender assembly can be configured to provide at least some coverage of each wheel present upon the ATV. However, in another embodiment, the fender assembly might only provide at least some coverage of certain wheels present upon the ATV. In one embodiment such as, for example, in FIGS. 1-2, an ATV 40 is shown to comprise a front fender assembly 46 and a rear fender assembly 56. The front fender assembly 46 is shown to be configured to prevent debris from being thrown from the left and right front wheels 42 and 43 and upon an operator and/or passenger(s) of the ATV 40 during travel of the ATV 40. Likewise, the rear fender assembly 56 is shown to be configured to prevent debris from being thrown from the left and right rear wheels 44 and 45 and upon an operator and/or passenger(s) of the ATV 40 during travel of the ATV 40. It will be appreciated that fender assemblies can be provided upon an ATV or other vehicle in any of a variety of other suitable configurations or arrangements.

The structure of the front and rear fender assemblies 46, 56 of the ATV 40 will now be described with reference to FIGS. 1-12 and 14-32. Referring now, collectively, to FIGS. 1-12, it can be seen that each of the front and rear fender assemblies 46, 56 can comprise a layered arrangement involving fender panels which at least partially overlap one another. In particular, the front fender assembly 46 is shown to comprise a lower front fender panel 47 and an upper front fender panel 50 which together provide a fender for the left and right front wheels 42 and 43 of the ATV 40. The lower front fender panel 47 is shown to comprise a left lower front fender portion 48 and a right lower front fender portion 49. The lower front fender panel 47 can be attached to the frame 41 such that the left lower front fender portion 48 extends at least partially over the left front wheel 42, and such that the right lower front fender portion 49 extends at least partially over the right front wheel 43. The lower front fender panel 47 is shown to comprise a top surface 48a and a bottom surface 48b. Portions of the top surface 48a corresponding with each of the left and right lower front fender portions 48 and 49 can provide a decorative body surface for the ATV 40. It will be appreciated that decorative body surfaces are those body panel portions which are readily apparent to an onlooker of the ATV. It would be common for an operator to wash, wax, and perhaps even buff such surfaces to improve the aesthetic appearance of the ATV. Portions of the bottom surface 48b corresponding with each of the left and right lower front fender portions 48 and 49 are shown to be positioned for receiving contact from debris respectively thrown by the left front wheel 42 and the right front wheel 43.

The upper front fender panel 50 is shown to at least partially cover the lower front fender panel 47 and to comprise a left upper front fender portion 51 and a right upper front fender portion 52. The upper front fender panel 50 can be attached to the frame 41 and/or the lower front fender panel 47 such that the left upper front fender portion 51 extends at least partially over the left front wheel 42, and such that the right upper front fender portion 52 extends at least partially over the right front wheel 43. The upper front fender panel 50 is shown to comprise a top surface 51a and a bottom surface 51b. At least part of the top surface 51a corresponding with each of the left and right upper front fender portions 51 and 52 can provide a decorative body surface for the ATV 40. Portions of the bottom surface 51b corresponding with each of the left and right upper front fender portions 51 and 52 are shown to be positioned for receiving contact from debris respectively thrown by the left front wheel 42 and the right front wheel 43. In this manner, it will be appreciated that both the lower and upper front fender panels 47 and 50 can each receive contact from debris thrown from the left and right front wheels 42 and 43, and can also each serve as decorative body panels.

Figure 6:
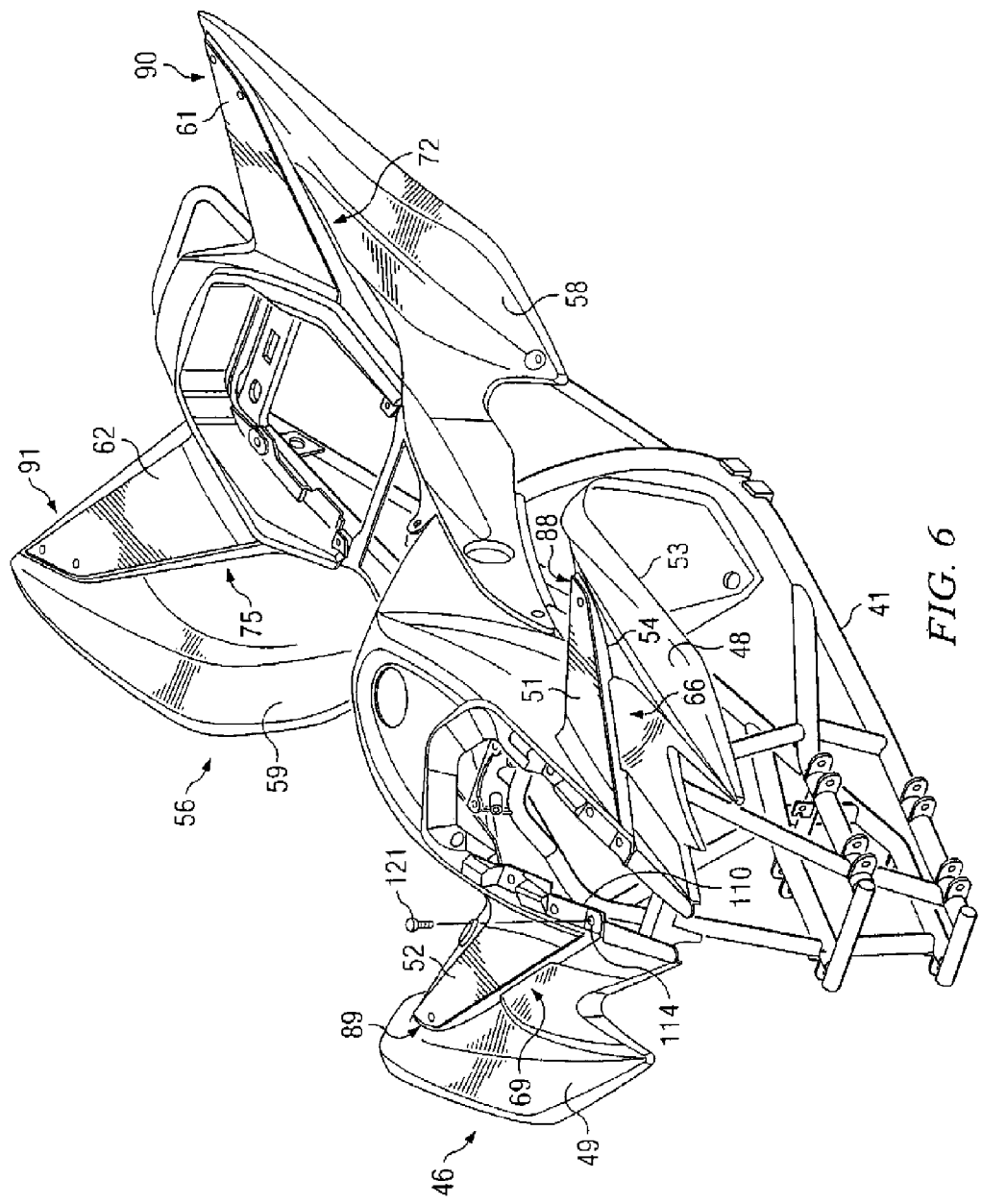
FIG. 6 is a front perspective view depicting the components of FIG. 5 as assembled and in association with a bolt.
Figure 7:
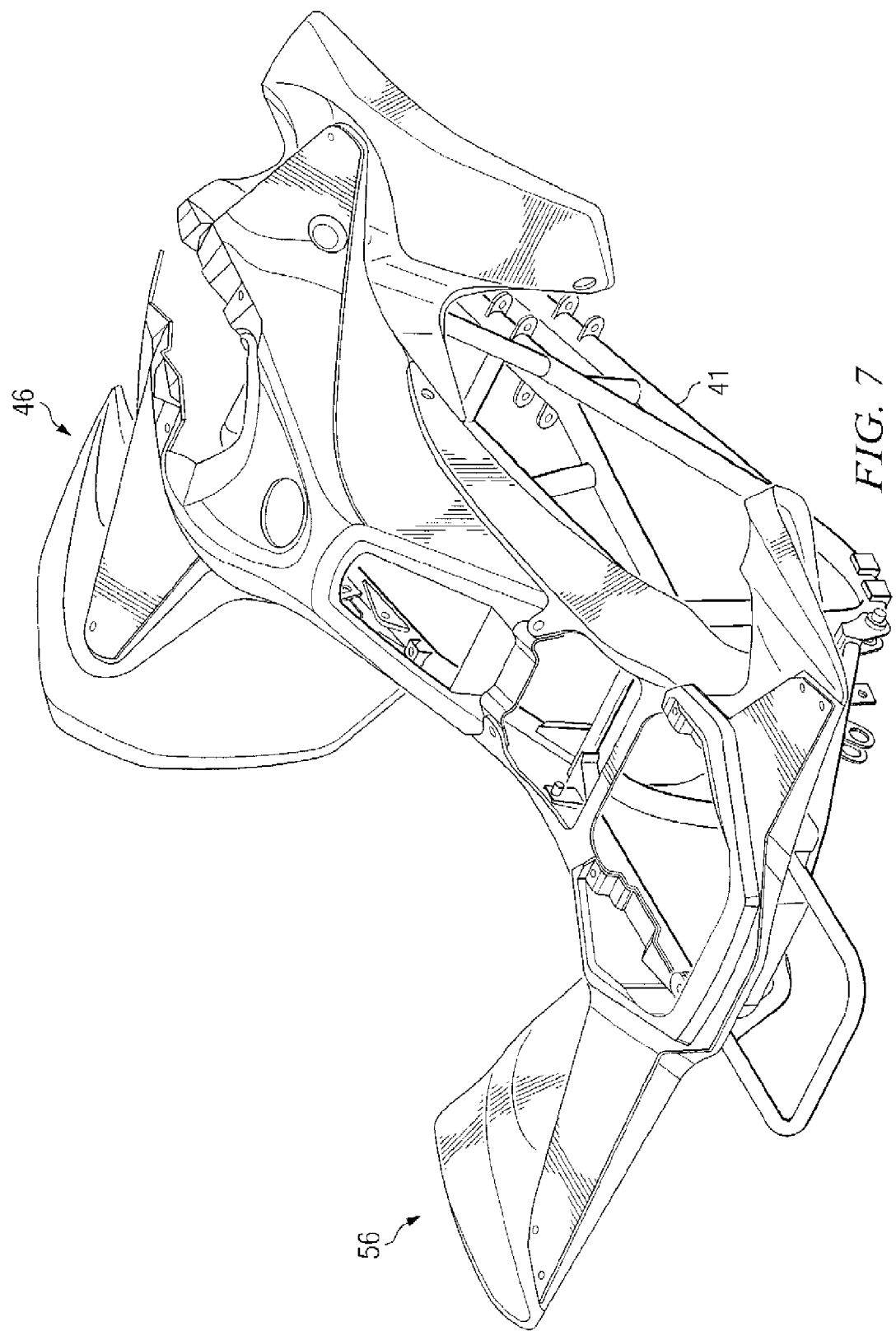
FIG. 7 is a rear perspective view depicting certain of the components of FIG. 6.
Figure 8:
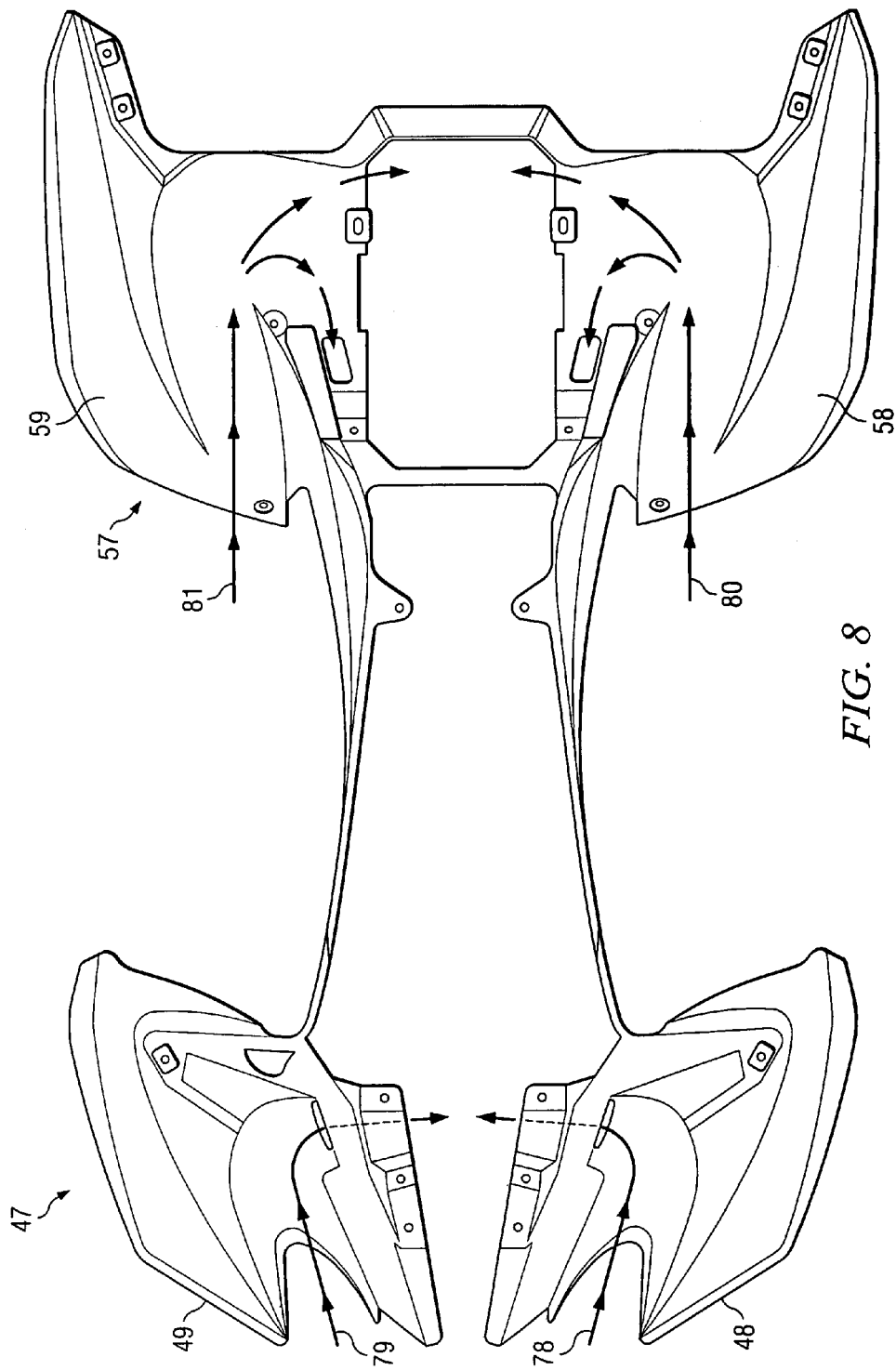
FIG. 8 is a top plan view depicting the lower front fender panel and the lower rear fender panel of FIG. 3 apart from the frame.

The lower and upper front fender panels 47 and 50 can be attached with respect to the remainder of the ATV 40 such that a portion of the bottom surface 51b of the upper front fender panel 50 is adjacent to at least a portion of the top surface 48a of the lower front fender panel 47. In one embodiment, at least a portion of the bottom surface 51b of the upper front fender panel 50 contacts at least a portion of the top surface 48a of the lower front fender panel 47. Also, the upper front fender panel 50 is shown to continuously extend from a left side of the ATV 40 to a right side of the ATV 40. In certain other embodiments, one or both of the lower and upper front fender panels might or might not continuously extend from a left side of the ATV to a right side of the ATV. As shown in FIG. 6, for example, the lower front fender panel 47 can extend to an outer perimeter 53, and a portion of the lower front fender panel 47 can extend beyond a portion of an outer perimeter 54 of the upper front fender panel 50. In addition or alternatively, a different portion of the upper front fender panel might extend beyond a portion of an outer perimeter of the lower front fender panel.

In one embodiment, the lower and upper front fender panels 47 and 50 can be formed from similar materials (e.g., plastic), and might even have the same color. In other embodiments, the lower and upper front fender panels 47 and 50 can be formed from different materials (e.g., one from plastic and the other from steel), and/or to have different colors. The upper front fender panel 50 can be removably attached to the frame 41 and/or the lower front fender panel 47 so as to enable an operator to easily, quickly and inexpensively change the color profile of ATV 40 by simply replacing the upper front fender panel 50 and without replacing the lower front fender panel 47. In addition, it will be appreciated that a layered body panel configuration as described herein can provide certain structural advantages, aesthetic advantages, and other advantages in manufacturing or servicing the ATV 40, or otherwise, some of which are described herein.

The rear fender assembly 56 is shown to comprise a lower rear fender panel 57 and an upper rear fender panel 60 which together provide a fender for the left and right rear wheels 44 and 45 of the ATV 40. The lower rear fender panel 57 is shown to comprise a left lower rear fender portion 58 and a right lower rear fender portion 59. The lower rear fender panel 57 can be attached to the frame 41 such that the left lower rear fender portion 58 extends at least partially over the left rear wheel 44, and such that the right lower rear fender portion 59 extends at least partially over the right rear wheel 45. The lower rear fender panel 57 is shown to comprise a top surface 58a and a bottom surface 58b. Portions of the top surface 58a corresponding with each of the left and right lower rear fender portions 58 and 59 can provide a decorative body surface for the ATV 40. Portions of the bottom surface 58b corresponding with each of the left and right lower rear fender portions 58 and 59 are shown to be positioned for receiving contact from debris respectively thrown by the left rear wheel 44 and the right rear wheel 45.

The upper rear fender panel 60 is shown to at least partially cover the lower rear fender panel 57 and to comprise a left upper rear fender portion 61 and a right upper rear fender portion 62. The upper rear fender panel 60 can be attached to the frame 41 and/or the lower rear fender panel 57 such that the left upper rear fender portion 61 extends at least partially over the left rear wheel 44, and such that the right upper rear fender portion 62 extends at least partially over the right rear wheel 45. The upper rear fender panel 60 is shown to comprise a top surface 61a and a bottom surface 61b. At least part of the top surface 61a corresponding with each of the left and right upper rear fender portions 61 and 62 can provide a decorative body surface for the ATV 40. Portions of the bottom surface 61b corresponding with each of the left and right upper rear fender portions 61 and 62 are shown to be positioned for receiving contact from debris respectively thrown by the left rear wheel 44 and the right rear wheel 45. In this manner, it will be appreciated that both the lower and upper rear fender panels 57 and 60 can each receive contact from debris from the left and right rear wheels 44 and 45, and can also each serve as decorative body panels.

Figure 9:
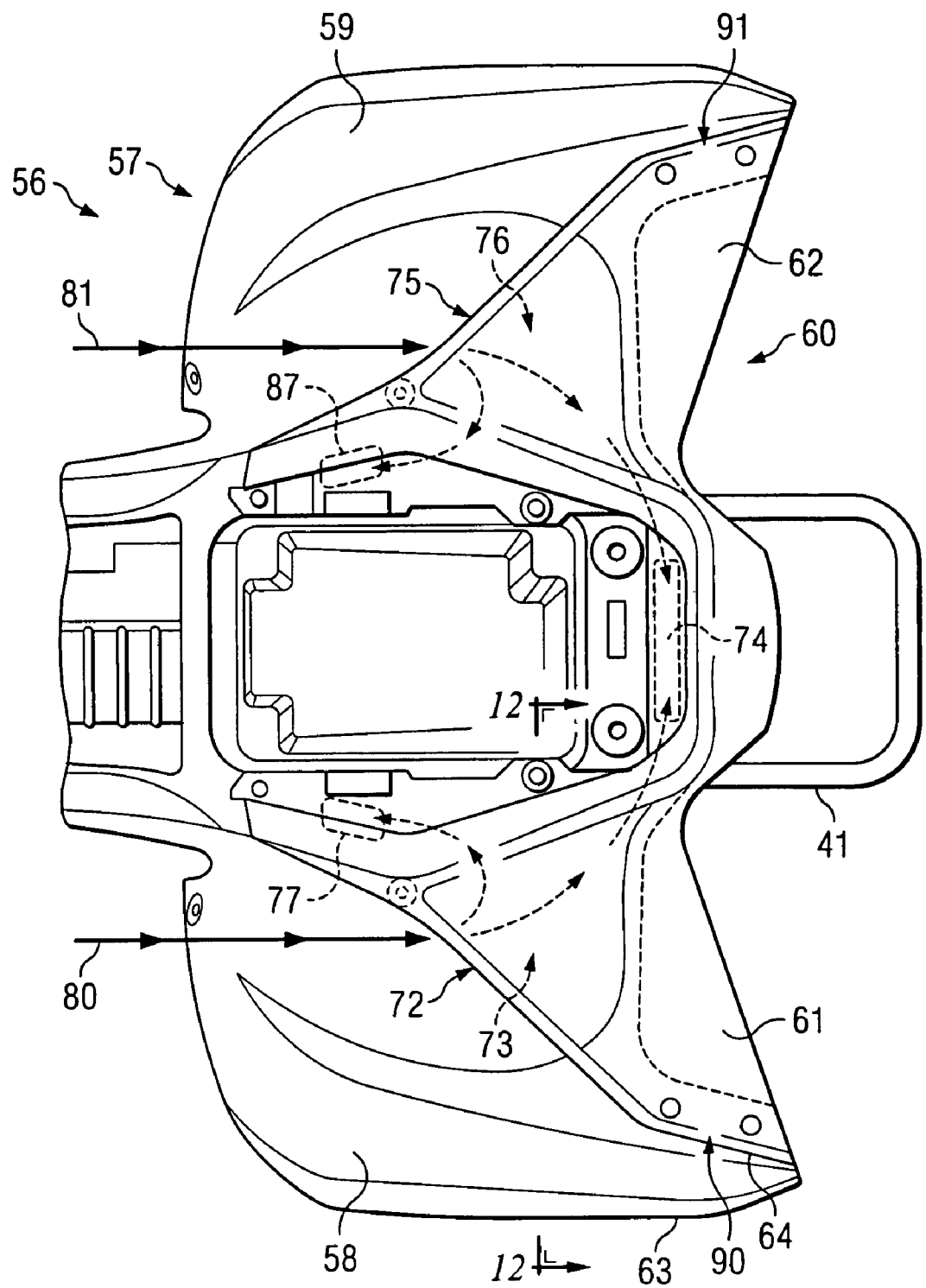
FIG. 9 is a top plan view depicting a rear portion of the ATV of FIGS. 1-2, wherein the seat has been removed for clarity of illustration.
Figure 12:
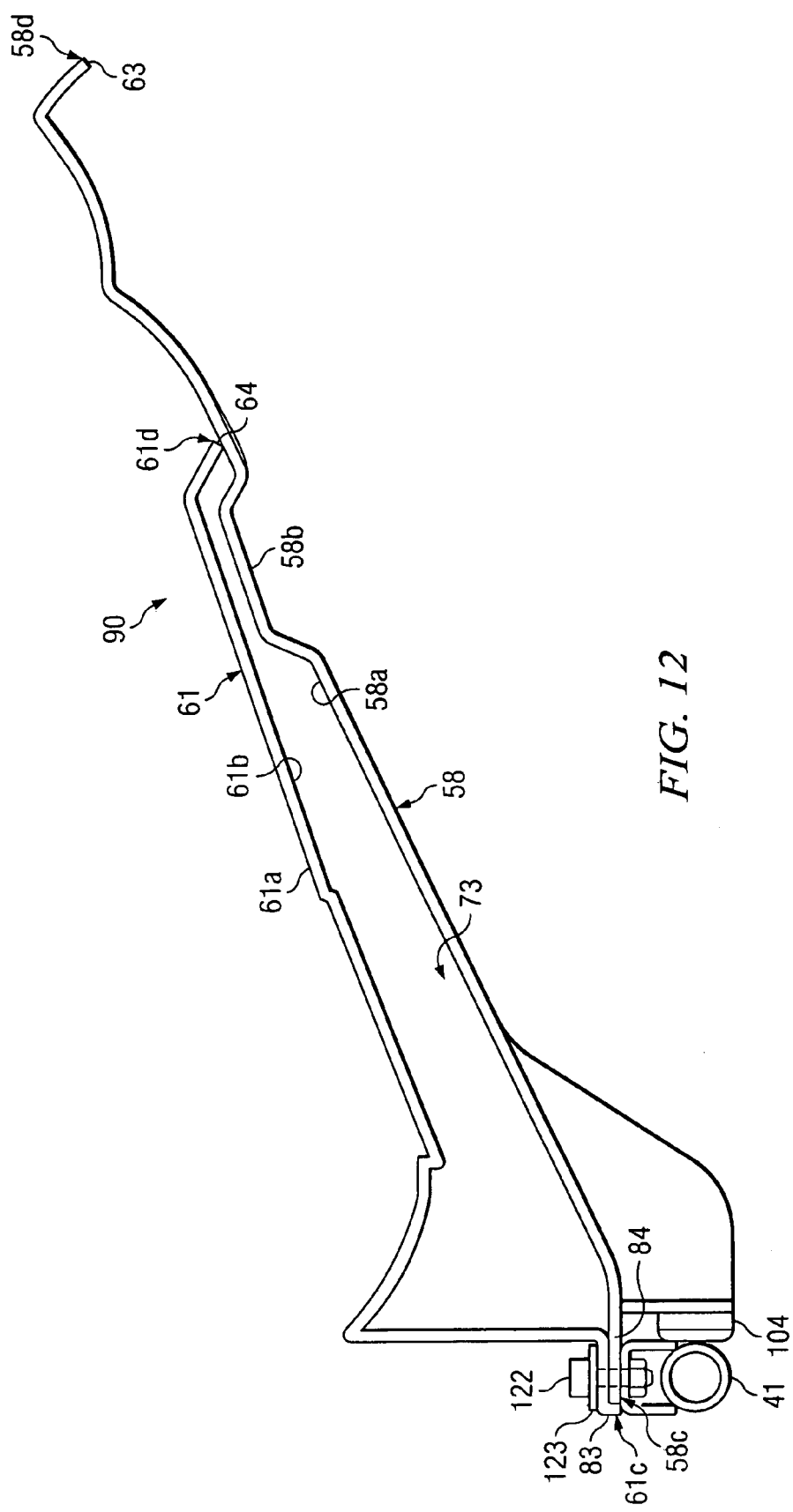
FIG. 12 is a cross-sectional view taken along section lines 12-12 in FIG. 9.
Figure 14:
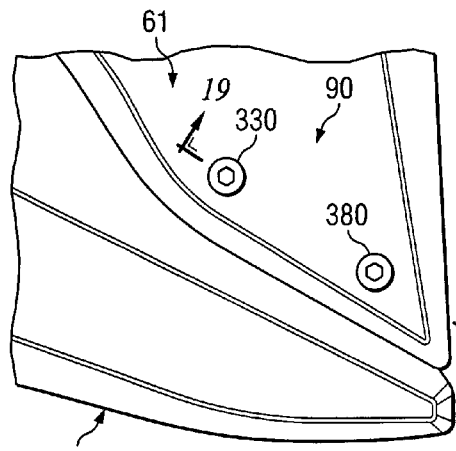
FIG. 14 is a top plan view depicting a portion of the rear fender assembly of FIG. 9.
Figure 15:
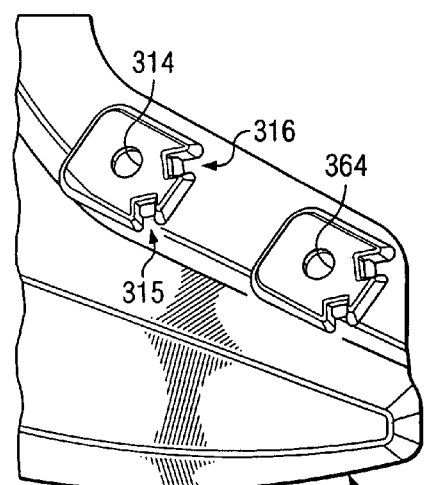
FIG. 15 is a top perspective view depicting a portion of the lower rear fender panel apart from the other components of FIG. 14.

The lower and upper rear fender panels 57 and 60 can be attached with respect to the remainder of the ATV 40 such that a portion of the bottom surface 61b of the upper rear fender panel 60 is adjacent to at least a portion of the top surface 58a of the lower rear fender panel 57. In one embodiment, at least a portion of the bottom surface 61b of the upper rear fender panel 60 contacts at least a portion of the top surface 58a of the lower rear fender panel 57. Also, each of the lower and upper rear fender panels 57 and 60 are shown to continuously extend from a left side of the ATV 40 to a right side of the ATV 40. In certain other embodiments, one or both of the lower and upper rear fender panels might not continuously extend from a left side of the ATV to a right side of the ATV. As shown in FIGS. 9 and 12, for example, the lower rear fender panel 57 can extend to an outer perimeter 63, and a portion of the lower rear fender panel 57 can extend beyond a portion of an outer perimeter 64 of the upper rear fender panel 60. In addition or alternatively, a different portion of the upper rear fender panel 60 might extend beyond a portion of the outer perimeter 63 of the lower rear fender panel 57.

In one embodiment, the lower and upper rear fender panels 57 and 60 can be formed from similar materials (e.g., plastic), and might even have the same color. In other embodiments, the lower and upper rear fender panels 57 and 60 can be formed from different materials (e.g., one from plastic and the other from steel), and/or to have different colors. The upper rear fender panel 60 can be removably attached to the frame 41 and/or the lower rear fender panel 57 so as to enable an operator to easily, quickly and inexpensively change the color profile of ATV 40 by simply replacing the upper rear fender panel 60 and without replacing the lower rear fender panel 57.

The front fender assembly 46 is shown to be provided separately from the rear fender assembly 56. However in an alternative embodiment, it will be appreciated that at least part of a front fender assembly might be provided integrally (e.g., through a common molding process) with at least part of a rear fender assembly. For example, in one alternative embodiment, a lower front fender panel might be formed integrally with a lower rear fender panel (e.g., such that the panel may extend from a forward end of an ATV to a rearward end of the ATV). An upper front fender panel might additionally or alternatively be formed integrally with an upper rear fender panel (e.g., such that the panel may extend from a forward end of an ATV to a rearward end of the ATV). However, by facilitating provision of separate front and rear fender assemblies, it will be appreciated that manufacturability of the fender assemblies can be rendered more efficient and less costly such as, for example, by enabling use of smaller molding equipment. Also, while certain fender panels are described and/or depicted herein as extending at least partially over two respective wheels of an ATV, it will be appreciated that in certain circumstances, one or more fender panels can extend at least partially over only one wheel of an ATV, or alternatively over three or more respective wheels of an ATV.

It will be appreciated that a layered fender assembly in accordance with one embodiment, and such as described above with respect to the front fender assembly 46 and the rear fender assembly 56, can exhibit sufficient strength and rigidity so as to eliminate need for certain or all of the elongated metal wire stays (e.g., 557 in FIG. 13 as described above) which are conventionally employed for supporting fender assemblies upon ATVs. As wire stays are cumbersome, difficult to install, prone to snagging, and expensive, it will be appreciated that a fender assembly in accordance with one embodiment can provide significant advantages by removing the need for certain or all supporting wire stays. For example, with reference to FIGS. 3, 5, and 12, it can be seen that the left lower rear fender portion 58 extends from an inner end 58c to an outer end 58d. Likewise, the left upper rear fender portion 61 extends from an inner end 61c to an outer end 61d. Each of the inner ends 58c and 61c are shown in FIG. 12 to be attached to the frame 41 of the ATV 40. In particular, the inner end 58c of the left lower rear fender portion 58 is shown in FIG. 12 to contact the inner end 61c of the left upper rear fender portion 61, and a bolt 122 is shown to pass through a collar 123 and into aligned apertures in each of the inner ends 58c, 61c and the frame 41. However, the inner ends 58c and 61c can be directly or indirectly attached to the frame 41 of the ATV 40 in any of a variety of suitable alternative configurations which may or may not involve fasteners such as bolts.

In one embodiment, the left lower rear fender portion 58 is shown in FIG. 12 to integrally comprise a leg 103 depending beneath the left lower rear fender portion 58 adjacent to the inner end 58c. The leg 103 can be configured to laterally compress against the frame 41, as shown in FIG. 12, such as for transmitting forces to the frame 41 arising from downward vertical deflection of the rear fender assembly 56 (e.g., such as if a heavy object were dropped upon the rear fender assembly 56). The leg 103 is shown to comprise a rubber bumper 104 which is configured to contact the frame 41.

The left upper rear fender portion 61 can be attached to the left lower rear fender portion 58 at an attachment location 90. While the attachment location 90 can be provided adjacent to at least one of the outer ends 58d and 61d, it can be seen in that, in the embodiment of FIG. 12, the attachment location 90 is adjacent to the outer end 61d of the left upper rear fender portion 61, and that the outer end 58d of the left lower rear fender portion 58 defines at least a portion of the outer perimeter of the rear fender assembly 56. In an alternative embodiment, the attachment location can be adjacent to the outer end of the left lower rear fender portion, and the outer end of the left upper rear fender portion can define at least a portion of the outer perimeter of the rear fender assembly.

The left upper rear fender portion 61 can be attached to the left lower rear fender portion 58 at the attachment location 90 in any of a variety of suitable configurations. One of these configurations is described in detail below in connection with FIGS. 14-19. In one embodiment, as shown in FIG. 19, for example, the left upper rear fender portion 61 contacts the left lower rear fender portion 58 at the attachment location 90.

Figure 13:
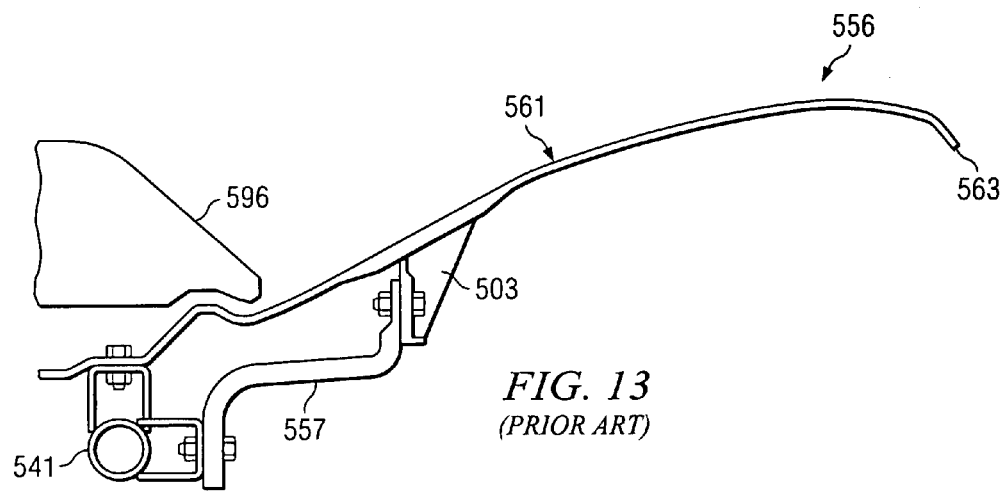
FIG. 13 is a cross-sectional view depicting a fender assembly of a conventional ATV.

However, regardless of how the left upper rear fender portion 61 is attached to the left lower rear fender portion 58 at the attachment location 90, it will be appreciated that the left upper rear fender portion 61 and the left lower rear fender portion 58 can cooperate to facilitate resistance of the attachment location 90 and/or an outer perimeter of the rear fender assembly 56 to vertical deflection (i.e., without the use of convention elongated metal wire stays such as 557 in FIG. 13). By attaching the left upper rear fender portion 61 to the left lower rear fender portion 58 at the inner ends 58c, 61c and at the attachment location 90, it will be appreciated that the portions of the left upper rear fender portion 61 and the left lower rear fender portion 58 spanning this distance enter a tension/compression relationship as a vertical load is applied to the left portion of the rear fender assembly 56. This tension/compression relationship facilitates resistance to vertical deflection, and without the presence of elongated metal wire stays such as 557 in FIG. 13, as well as sufficient resilience to recover from such vertical deflection. It will be appreciated that a fender assembly can be subjected to vertical deflection such as when a heavy object falls upon the fender assembly, when an operator leans or sits upon the fender assembly, when excessive cargo is hauled upon the fender assembly, or when the vehicle collides, for example.

It will be appreciated that the right portion of the rear fender assembly 56 can be provided in an arrangement similar to that described above with respect to the left portion of the rear fender assembly 56 for avoiding the presence of one or more elongated metal wire stays as are conventionally employed to facilitate resistance of a fender assembly to vertical deflection. In particular, each of the right lower rear fender portion 59 and the right upper rear fender portion 62 can have respective inner ends and respective outer ends. The respective inner ends can be attached to the frame 41, and the right lower rear fender portion 59 and the right upper rear fender portion 62 can be attached together at an attachment location 91 disposed adjacent to at least one of the respective outer ends (e.g., the outer end of the right upper rear fender portion 62 as shown in FIG. 6).

Additionally, it will be appreciated that the front fender assembly 46 can be arranged similarly to the rear fender assembly 56 to avoid the presence of one or more elongated metal wire stays as are conventionally employed for resisting vertical deflection of a fender assembly. For example, each of the left lower front fender portion 48 and the left upper front fender portion 51 can have respective inner ends 48*c*, 51*c* and respective outer ends 48*d*, 51*d*. The respective inner ends 48*c*, 51*c* can be attached to the frame 41 as described above with respect to the inner ends 58*c*, 61*c*. The left lower front fender portion 48 and the left upper front fender portion 51 can be attached together at an attachment location 88 disposed adjacent to the outer end 51*d* of the left upper front fender portion 51.

Likewise, each of the right lower front fender portion 49 and the right upper front fender portion 52 can be provided in a similar arrangement which avoids the presence of one or more elongated metal wire stays as are conventionally employed. In particular, each of the right lower front fender portion 49 and the right upper front fender portion 52 can have respective inner ends and respective outer ends. The respective inner ends can be attached to the frame 41, and the right lower front fender portion 49 and the right upper front fender portion 52 can be attached together at an attachment location 89 disposed adjacent to at least one of the respective outer ends (e.g., the outer end of the right upper front fender portion 52 as shown in FIG. 6).

One or more channels can be provided in the front fender assembly 46 and/or the rear fender assembly 56 to facilitate the passage of fluid along one or more predetermined pathways. Such fluid can include, for example, mud, air, and water. The channels can be configured to facilitate cleaning of mud from between overlapping fenders on the ATV 40, and can also facilitate passage of air for cooling of components (e.g., radiator, transmission, engine, or electronics) of the ATV 40, and can additionally provide aesthetic value.

In one embodiment, the rear fender assembly 56 can define two channels 73, 76. In particular, the left upper rear fender portion 61 is shown to cooperate with the left lower rear fender portion 58 in a spaced relationship to define both an access opening 72 and the channel 73. The access opening 72 is shown to be directed toward a forward end 106 of the ATV 40. The channel 73 is shown to be partially defined by a depressed portion in the lower rear fender panel 57. The channel 73 is shown to be disposed between the inner ends 58*c*, 61*c* and the attachment location 90 such that the left upper rear fender portion 61 is attached to the left lower rear fender portion 58 on opposite sides of the channel 73. The channel 73 is shown to at least partially overlie the left rear wheel 44 and to be configured to facilitate passage of fluid along a predetermined pathway 80 from the access opening 72 to predetermined egress openings 74 (see FIGS. 9 and 11) and 77 (see FIG. 9). The channel 73 can extend in a direction which is generally longitudinally oriented from the forward end 106 of the ATV 40 to a rearward end 107 of the ATV 40 such that the predetermined pathway 80 is so routed, as shown best in FIG. 9. However, it will be appreciated that a channel can be defined between overlapping body panels in any of a variety of other configurations.

Much as described above with respect to the access opening 72 and the channel 73, the right upper rear fender portion 62 is shown to cooperate with the right lower rear fender portion 59 in a spaced relationship to define both an access opening 75 and the channel 76. The channel 76 is shown to at least partially overlie the right rear wheel 45 and to be configured to facilitate passage of fluid along a predetermined pathway 81 from the access opening 75 to the predetermined egress opening 74 (see FIGS. 9 and 11) and to a predetermined egress opening 87 (see FIG. 9). The channel 76 can extend in a direction which is generally longitudinally oriented from the forward end 106 of the ATV 40 to the rearward end 107 of the ATV 40 such that the predetermined pathway 81 is so routed, as shown best in FIG. 9.

Figure 11:
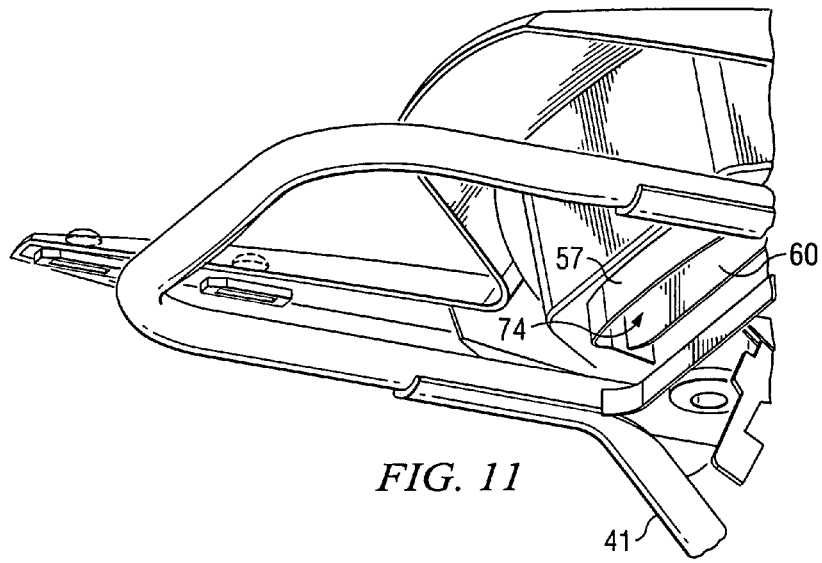
FIG. 11 is a bottom perspective view depicting a rear portion of the ATV of FIGS. 1-2.

The predetermined egress opening 74 is shown in FIGS. 9 and 11 to be directed downwardly and to be at least partially defined by the lower rear fender panel 57 at a location near a rearward end 107 of the ATV 40 and disposed midway between the left and right sides of the ATV 40. The predetermined egress opening 74 might additionally or alternatively be at least partially defined by the upper rear fender panel 60. In this configuration, it will be appreciated that a substantial portion of the fluid captured by the access openings 72, 75 and the channels 73, 76 can be directed through the predetermined egress opening 74 to a location behind the ATV 40. Much or all of the remaining fluid (e.g., slower-moving fluid) captured by the access openings 72, 75 and the channels 73, 76 can be directed through the predetermined egress openings 77, 87 to a location beneath the ATV 40. Inside portions of the lower and upper rear fender panels 57, 60 (e.g., adjacent to left lower and upper inside edge portions 84, 83 discussed below) can be raised or otherwise formed to prevent such fluid from accessing certain areas disposed beneath a seat 96 of the ATV 40 which might, for example, include an air intake box for the engine of the ATV 40. However, it will be appreciated that one or more predetermined egress openings might be provided in any of a variety of alternative locations and arrangements (e.g., see the embodiment of FIGS. 36, 36*a*, 37, 38, and 38*a*).

As described above with respect to the rear fender assembly 56, the front fender assembly 46 can define two channels 67, 70. In particular, the left upper front fender portion 51 is shown to cooperate with the left lower front fender portion 48 in a spaced relationship to define both an access opening 66 and the channel 67. The channel 67 is shown to at least partially overlie the left front wheel 42 and to be configured to facilitate passage of fluid along a predetermined pathway 78 from the access opening 66 to a predetermined egress opening 68. The channel 67 can extend in a direction which is generally longitudinally oriented from the forward end 106 of the ATV 40 to the rearward end 107 of the ATV 40 such that the predetermined pathway 78 is so routed.

As described above with respect to the access opening 66 and the channel 67, the right upper front fender portion 52 is shown to cooperate with the right lower front fender portion 49 in a spaced relationship to define both an access opening 69 and the channel 70. The channel 70 is shown to at least partially overlie the right front wheel 43 and to be configured to facilitate passage of fluid along a predetermined pathway 79 from the access opening 69 to a predetermined egress opening 71 (shown in FIG. 4). The channel 70 can extend in a direction which is generally longitudinally oriented from the forward end 106 of the ATV 40 to the rearward end 107 of the ATV 40 such that the predetermined pathway 79 is so routed.

Figure 10:
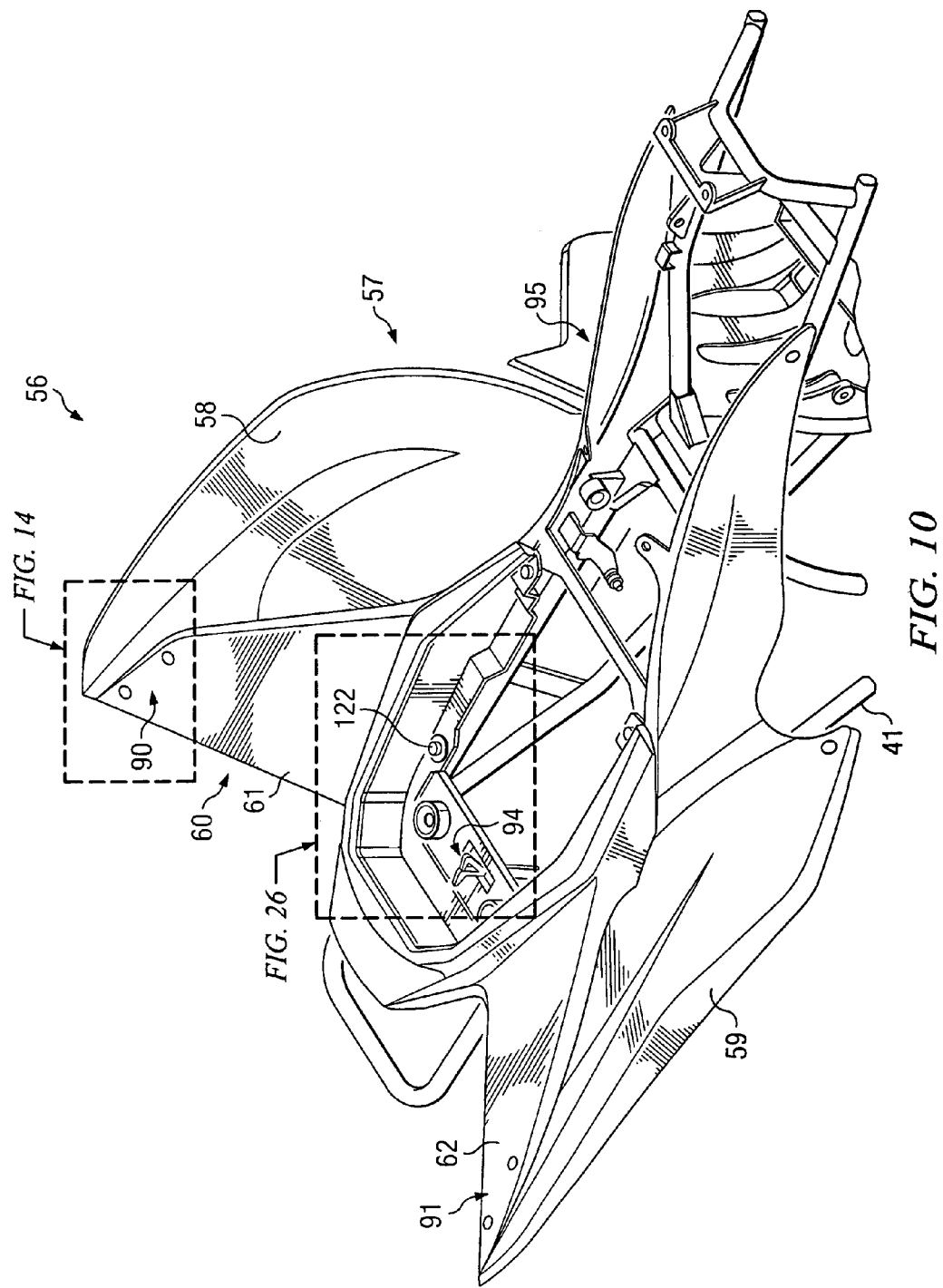
FIG. 10 is a perspective view depicting a rear portion of the ATV of FIGS. 1-2, wherein the seat and other components have been removed for clarity of illustration.
Figure 27:
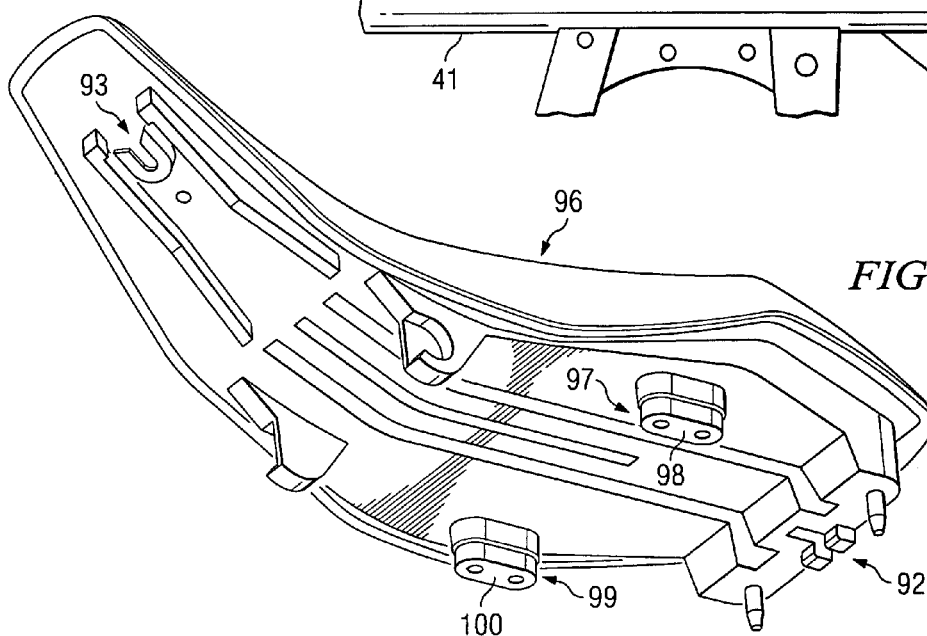
FIG. 27 is a bottom perspective view of the seat removed from the ATV of FIGS. 1-2.

As previously indicated, the lower and upper rear fender panels 57, 60 can be attached to the frame 41 by passing fasteners (e.g., bolt 122 in FIG. 12) through aligned apertures in inner ends (e.g., 58*c*, 61*c*) of fender portions (e.g., 58, 61) and into apertures (e.g., threaded apertures) in the frame 41. In accordance with one embodiment, the lower and upper rear fender panels 57, 60 can be attached to the frame 41 prior to attachment of the seat 96 to the frame 41. The seat 96 is shown in FIG. 27 to include hooks 92 and 93 for respectively and selectively interfacing catches 94 and 95 which are attached to the frame 41, as shown in FIG. 10. Through use of the hooks 92, 93 and catches 94, 95, for example, the seat 96 can be configured for selective attachment to the frame 41. When the seat 96 is not attached to the frame 41, as shown in FIG. 10, it can be seen that the area beneath the seat can be accessible for servicing and cleaning, for example. Accordingly, it will be appreciated that an ability to conveniently remove and attach the seat in this manner can be advantageous.

The seat 96 is shown in FIG. 27 to include a left bumper member 97 and a right bumper member 99 which each depend from a bottom surface of the seat 96. The left bumper member 97 is shown to comprise a left compression surface 98, and the right bumper member 99 is shown to comprise a right compression surface 100. In one embodiment, each of the left and right compression surfaces 98, 100 comprise rubber. In another embodiment, each of the left and right bumper members 97, 99 are formed partially or completely from rubber. While one or more of the compression surfaces and/or bumper members might be provided integrally with other portions of the seat, it will be appreciated that they might alternatively be attached to other portions of the seat with adhesives, fasteners, interlocking mechanical structures, or the like.

Figure 28:
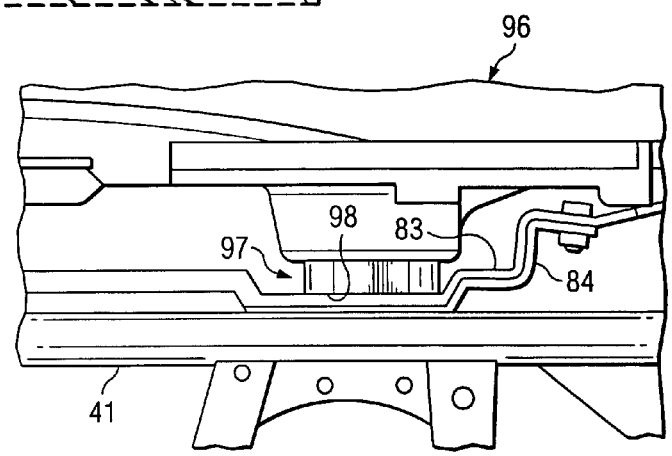
FIG. 28 is a side elevational view depicting the seat in association with the rear fender assembly and frame of the ATV of FIGS. 1-2.

When the seat 96 is attached to the frame 41, as shown in FIG. 28, the left compression surface 98 is shown to contact a left upper inside edge portion 83 of the left upper rear fender portion 61 provided at the inner end 61*c* of the left upper rear fender portion 61. The left upper inside edge portion 83 is shown to overlap and contact a left lower inside edge portion 84 of the left lower rear fender portion 58 provided at the inner end 58*c* of the left lower rear fender portion 58 (see also FIG. 12). A portion of the left lower inside edge portion 84 which corresponds with the left compression surface 98 is shown in FIG. 28 to contact the frame 41 as well as to contact a portion of the left upper inside edge portion 83 which corresponds with the left compression surface 98. In this manner, upon attachment of the seat 96 to the frame 41 as shown in FIG. 28, the left bumper member 97 sandwiches both the left upper inside edge portion 83 and the left lower inside edge portion 84 between the left compression surface 98 and the frame 41. Similarly, upon attachment of the seat 96 to the frame 41, the right bumper member 99 sandwiches both a right upper inside edge portion 85 (see FIG. 5) and a right lower inside edge portion 86 (see FIG. 3) between the right compression surface 100 and the frame 41. In doing so, and by assisting the aforementioned fasteners (e.g., bolt 122 in FIG. 12), the left and right bumper members 97, 99 sandwich the respective edge portions 83, 84, 85, 86 of the respective fender portions 61, 58, 62, 59 to facilitate securement of the rear fender assembly 56 with respect to the frame 41. The left and right bumper members 97, 99 can also serve to prevent vibration of the rear fender assembly 56 with respect to the frame 41.

An attachment location of overlapping fender panels can be achieved in any of a variety of suitable configurations. One of those configurations will now be described with reference to the attachment location 90 and in connection with the views of FIGS. 14-19. It will be appreciated that the attachment location 91 (see FIG. 10) can be provided in an arrangement similar to that described below with respect to the attachment location 90. It will also be appreciated that the attachment locations 88 and 89 can also be provided in an arrangement similar to that described below with respect to the attachment location 90, except that instead of two bolts (i.e., 330, 380 shown in FIG. 19) and pockets (i.e., 312, 362 also shown in FIG. 19) as are shown in connection with the attachment location 90, each of the attachment locations 88 and 89 are shown to only comprise a single bolt (which would accordingly each involve only a single pocket). It will be appreciated, however, that an attachment location involving overlapping panels can involve any number of bolts and pockets.

In particular, at the attachment location 90, bolts 330 and 380 are shown to pass through respective apertures 310 and 360 in the left upper rear fender portion 61. The left upper rear fender portion 61 can comprise annular portions (e.g., 358 in FIG. 19) surrounding and interiorly defining each of the apertures 310 and 360. The annular portions can be raised with respect to and/or have a greater thickness than portions of the left upper rear fender portion 61 exteriorly adjacent to the annular portions. The annular portions can be configured to contact respective compression surfaces (e.g., 384 in FIG. 19) of respective bolts (e.g., 380 in FIG. 19), and can be configured to mitigate creep effects in the left upper rear fender portion 61 resulting from tightening of the bolts (e.g., 380). For example, referring to FIG. 19, when a pan head 382 of the bolt 380 is tightened until the compression surface 384 contacts a T-nut 370 (as shown with respect to the bolt 330 and a T-nut 320), the annular portion 358 is compressed, thus providing tension upon the connection between the bolt 380 and the T-nut 370, but without resulting in any substantial deformation to the left upper rear fender panel portion 61 at areas other than beneath the compression surface 384 of the bolt 380. Accordingly, due to the presence of these annular portions (e.g., 358 in FIG. 19), no significant aesthetic deformation is likely to result to the left upper rear fender portion 61 despite full tightening of the bolts 330, 380 (as shown with respect to the bolt 330 in FIG. 19).

Figure 34:
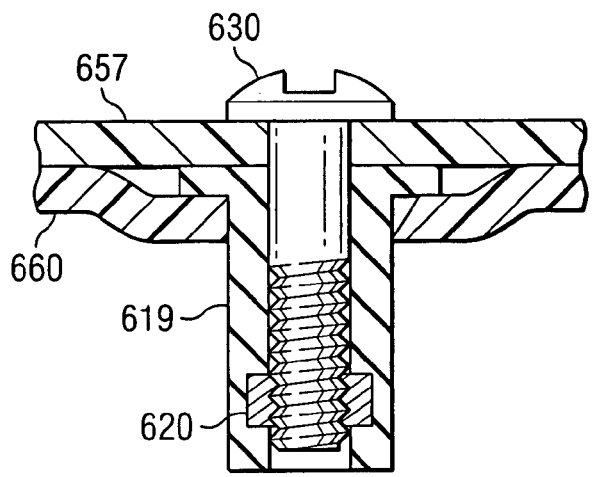
FIG. 34 is a sectional view of a fastener arrangement involving two overlapping panels, wherein the bolt is depicted in elevation and in an untightened orientation.
Figure 35:
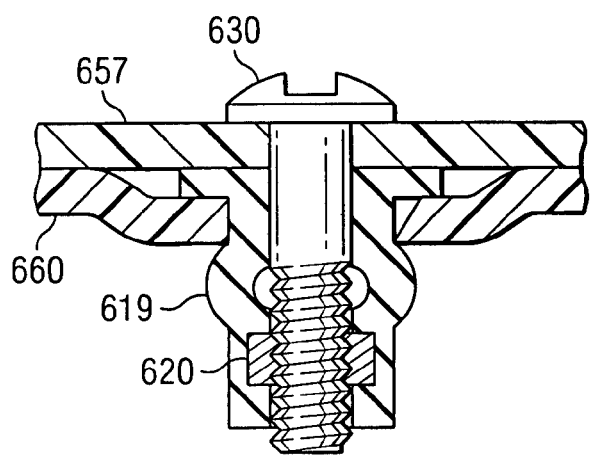
FIG. 35 is a sectional view of the components of FIG. 34, wherein the bolt is depicted in elevation and in a tightened orientation.
Figure 36:
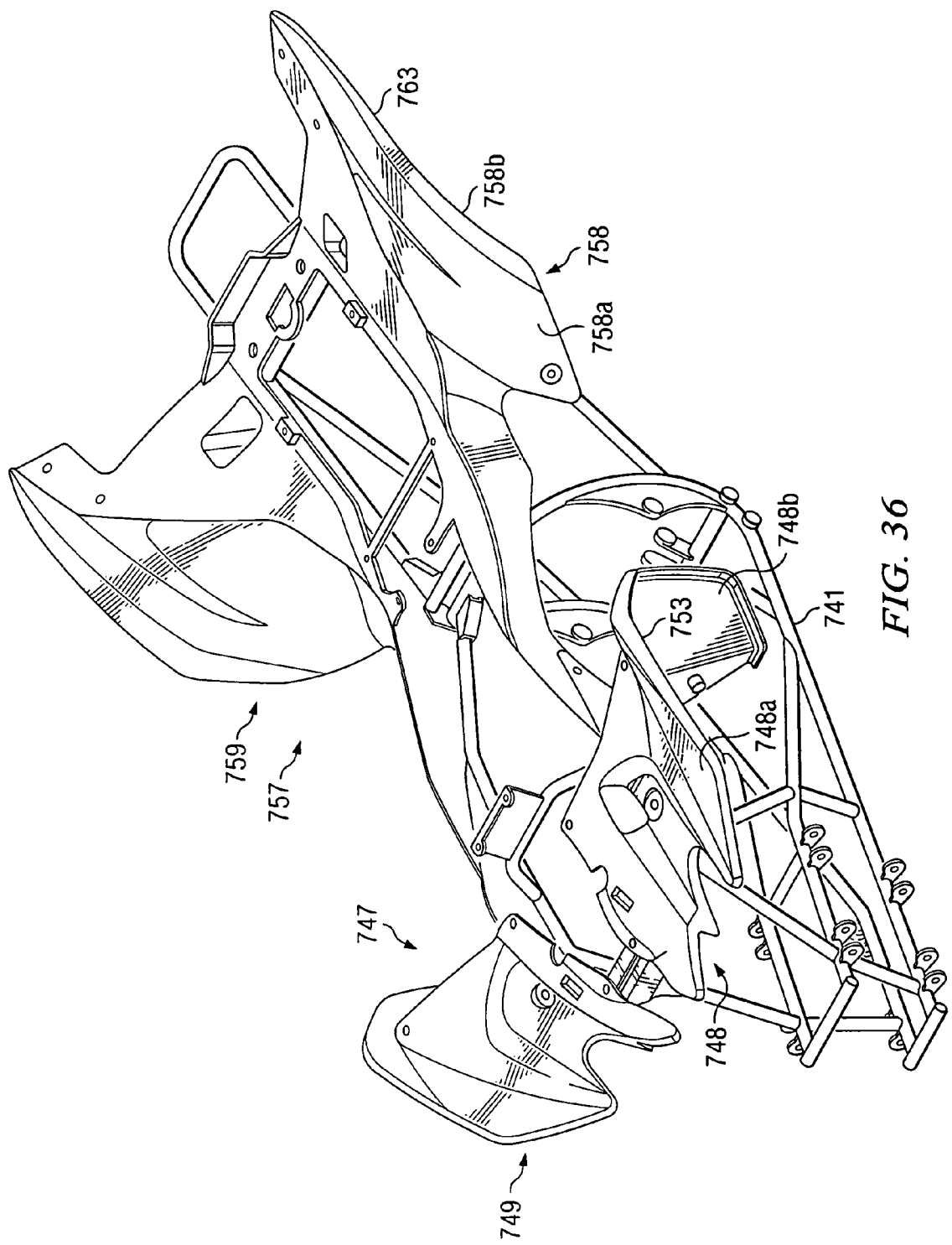
FIG. 36 is a front perspective view depicting a frame, a lower front fender panel, and a lower rear fender panel of an ATV in accordance with another embodiment.
Figure 36A:
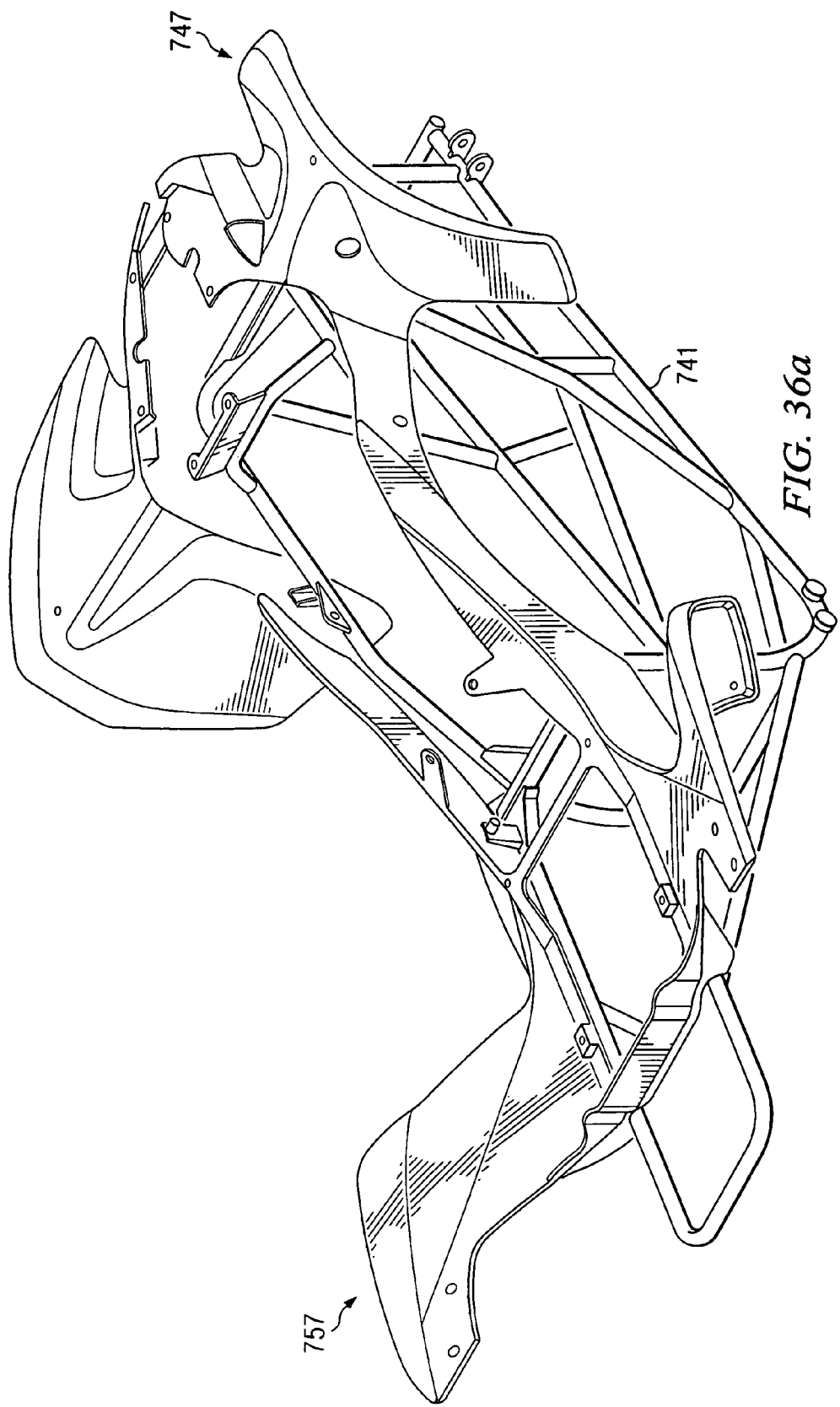
FIG. 36a is a rear perspective view depicting the components of FIG. 36.
Figure 37:
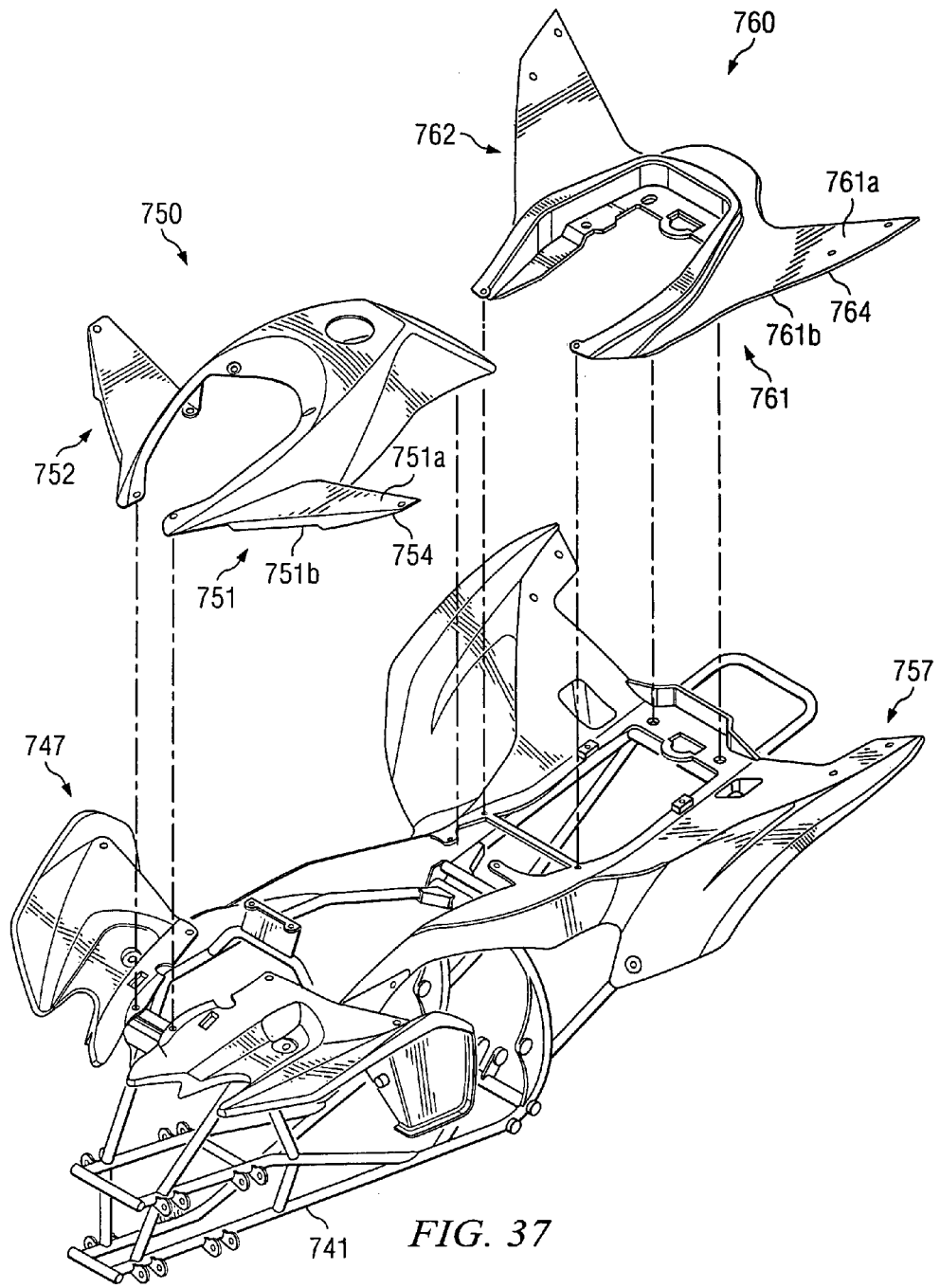
Figure 38:
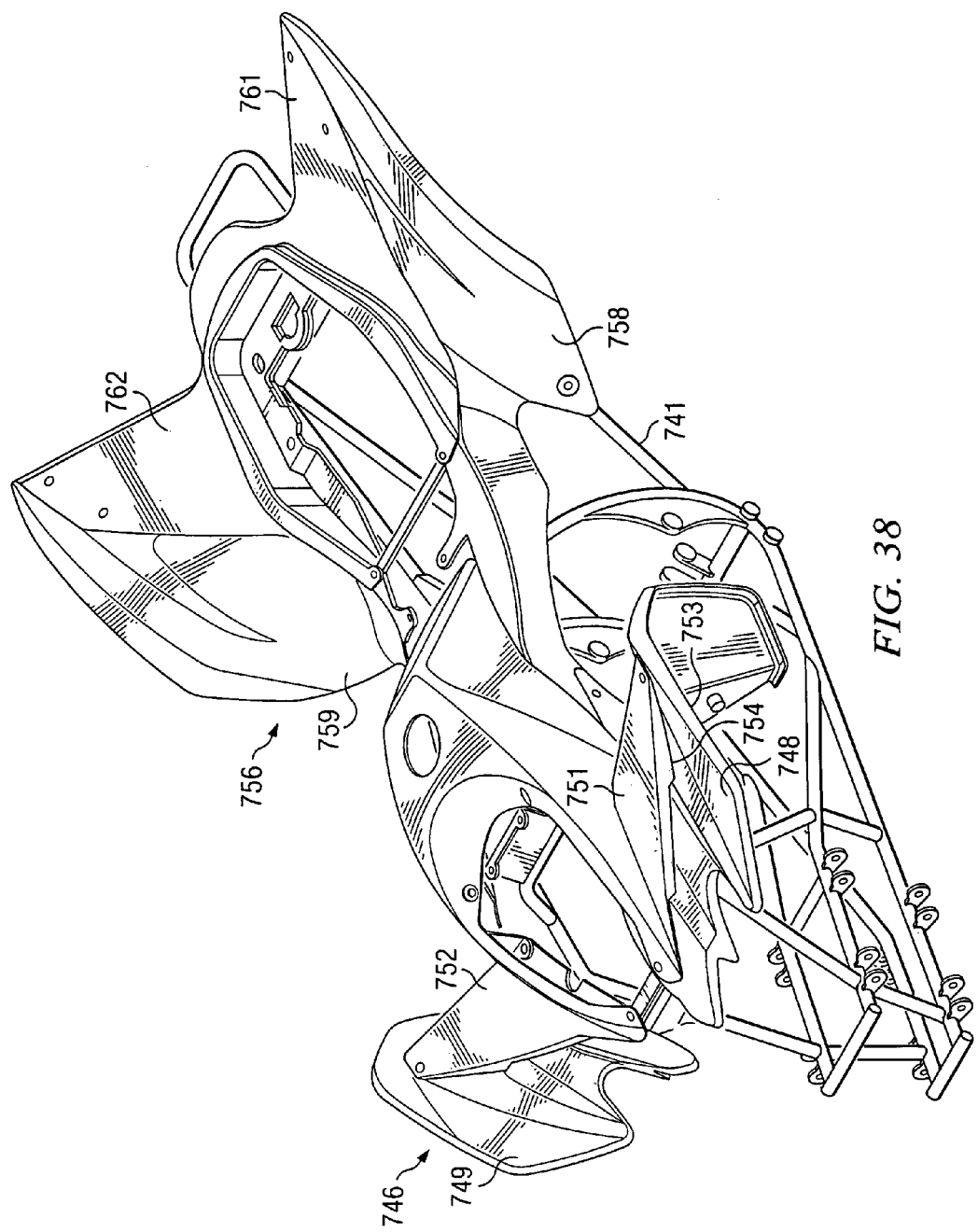
FIG. 38 is a front perspective view depicting the components of FIG. 37 as assembled.
Figure 38A:
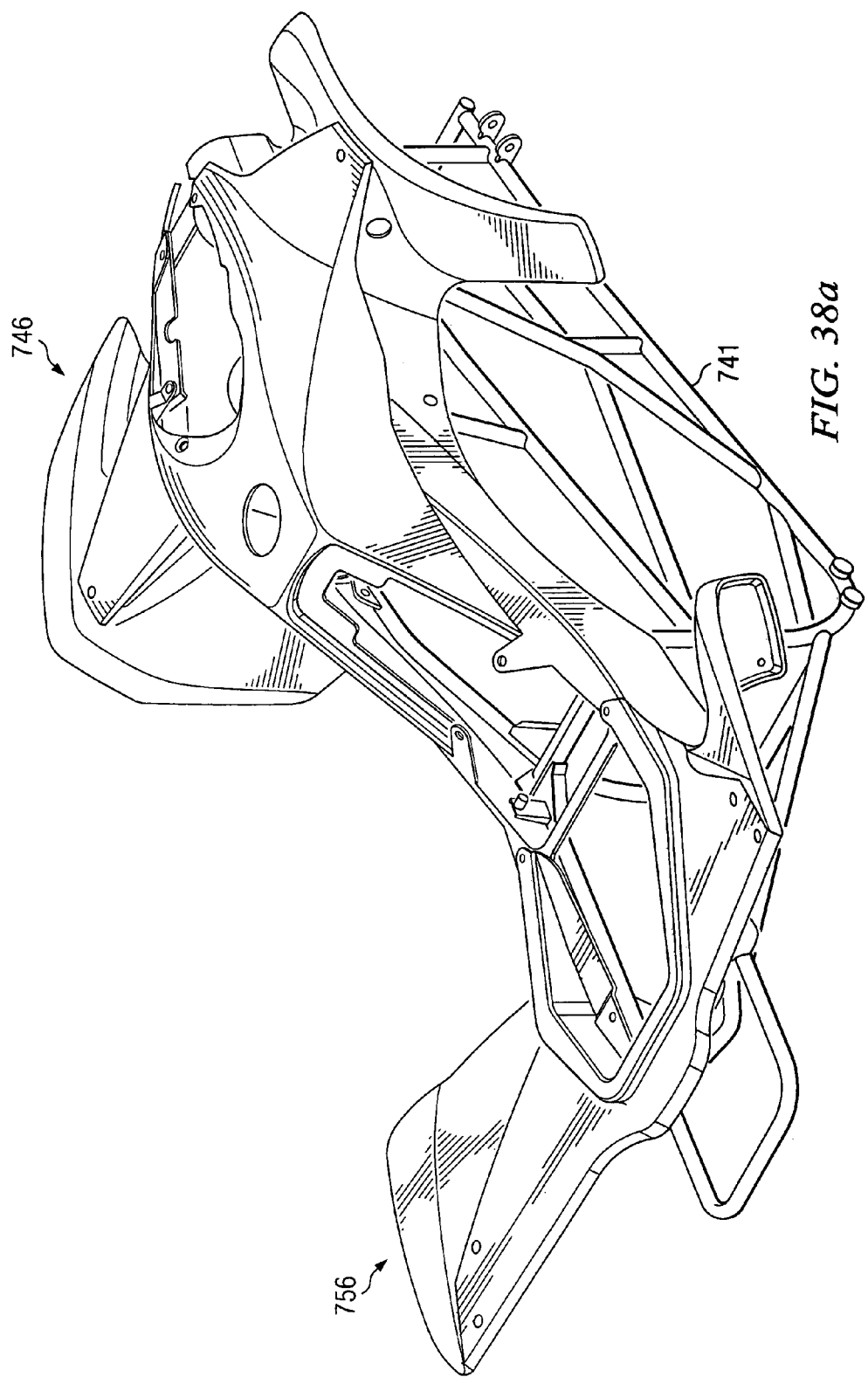
FIG. 38a is a rear perspective view depicting certain of the components of FIG. 38.

The left lower rear fender portion 58 is shown in FIGS. 15-19 to comprise two pockets 312 and 362 at the attachment location 90. Each of the pockets 312, 362 defines a respective opening 314, 364 extending through the left lower rear fender portion 58. For clarity of disclosure, it is noted that while pockets corresponding to the respective attachment locations 88, 89, 90 and 91 are visible in FIG. 8, the pockets are not depicted in FIGS. 3-5, as overlapping fender panels might be attached without use of pockets (e.g., as shown in FIGS. 34-35).

For example, the pocket 312 is shown to be configured to receive a base portion 322 of the T-nut 320 in a snap-fit arrangement such that a neck portion 324 of the T-nut 320 extends into the opening. The pocket 362 can be similarly configured to receive the T-nut 370. The neck portion (e.g., 324) of each T-nut (e.g., 320) can define a threaded aperture (e.g., 326) such that a threaded end of a corresponding bolt (e.g., 330) may be received by the neck portion when the neck portion extends through the opening (e.g., 314).

Figure 16:
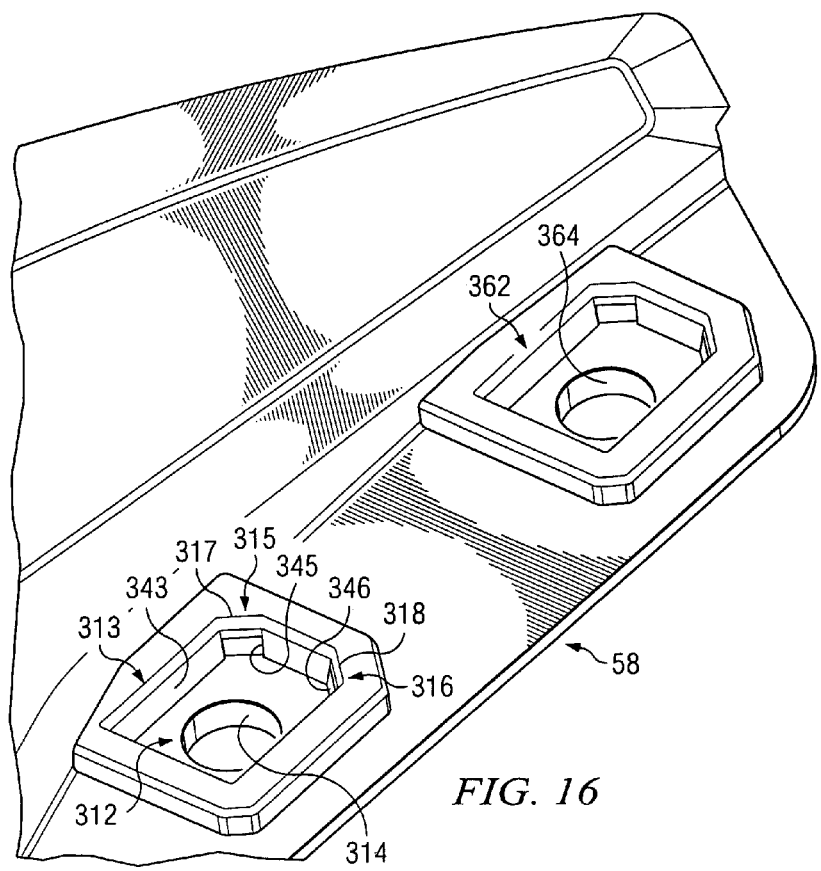
FIG. 16 is a bottom perspective view depicting the portion of the lower rear fender panel of FIG. 15.
Figure 17:
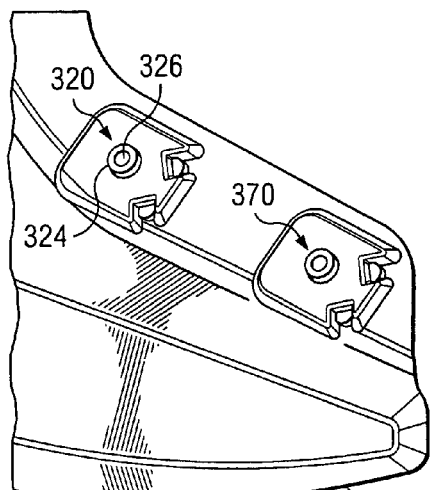
FIG. 17 is a top perspective view depicting the portion of the lower rear fender panel of FIG. 15 in association with T-nuts.
Figure 18:
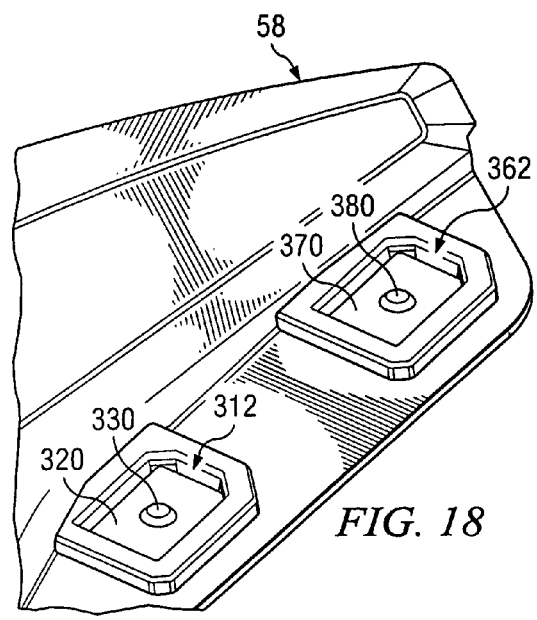
FIG. 18 is a bottom perspective view depicting the portion of the lower rear fender panel of FIG. 16 in association with T-nuts and bolts.
Figure 19:
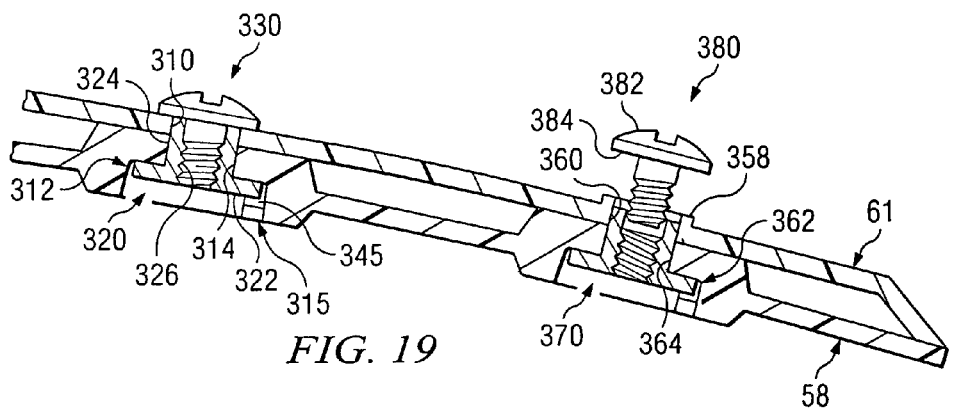
FIG. 19 is a cross-sectional view taken along section lines 19-19 in FIG. 14, wherein both of the bolts are depicted in elevation and one of the bolts is shown to be partially removed.

The pocket 312 can comprise a perimeter 313 which is configured to receive the T-nut 320, as shown in FIGS. 16 and 18. The perimeter 313 can include two beveled corners 317 and 318 but can be otherwise generally rectangular, as also shown in FIGS. 16 and 18. The pocket 312 is shown to also include a wall 343 and two corner stops 315 and 316. In particular, the wall 343 can extend from the perimeter 313 and can include notches 345 and 346 adjacent to each of the beveled corners 317 and 318. In one embodiment, as shown in FIGS. 15-18, the notches 345 and 346 can comprise apertures extending entirely through the left lower rear fender portion 58. The beveled corners 317 and 318 and the notches 345 and 346 are shown to together define the corner stops 315 and 316.

Once the T-nut 320 is inserted into the pocket 312, the corner stops 315 and 316 can cooperate with the wall 343 and the aperture 310 to facilitate retention of the T-nut 320 in the snap-fit arrangement within the pocket 312. In particular, once the T-nut 320 is inserted into the pocket 312, interaction of the neck portion 324 with the aperture 310 and interaction of the base portion 322 with the wall 343 and the corner stops 315, 316 can prevent the T-nut from easily being removed from the pocket 312. The pocket 362 can be configured similarly to the pocket 312 as shown, for example, in FIGS. 15-19.

In order to facilitate attachment of the left upper rear fender portion 61 to the left lower rear fender portion 58 at the attachment location 90, the T-nuts 320, 370 can be inserted into the respective pockets 312, 362 in a snap-fit arrangement as described above. The bolts 330, 380 can then be inserted into the respective apertures 310, 360 in the left upper rear fender portion 61 and into the threaded apertures (e.g., 326) of the respective T-nuts 320, 370 disposed within the respective pockets 312, 362 of the left lower rear fender portion 58. As described above, once the T-nuts 320, 370 are inserted into the respective pockets 312, 362, removal of the T-nuts 320, 370 from the respective pockets 312, 362 may not be easily accomplished. Accordingly, there is typically no need to manually hold the T-nuts 320, 370 during insertion of the bolts 330, 380 into the respective threaded apertures (e.g., 326) of the T-nuts 320, 370 because the pockets 312, 362 can be configured to provide this holding function. Because this configuration provides for automatic, hands-free retention of the T-nuts 320, 370, the process of assembling the left lower rear fender portion 58 and the left upper rear fender portion 61 at the attachment location 90 is rendered quite simple.

It will be appreciated that overlapping panels might be attached (e.g., at an attachment location) through use of any of a variety of alternative fastener arrangements. For example, in one alternative embodiment, as shown in FIGS. 34-35, respective panels 657 and 660 (e.g., vehicular body panels such as fender panels) can be attached through use of a bolt 630, a rubber boot 619, and a nut 620 which defines a threaded aperture for receiving a threaded end of the bolt 630. The rubber boot 619 can be inserted through an aperture in the panel 660, and the panel 657 can be arranged such that an aperture in the panel 657 is aligned with the aperture in the panel 660. The bolt 630 can then be threaded into the nut 620, as shown in FIG. 34. When the bolt 630 is tightened, the nut 620 is drawn toward the panels 657, 660, thus compressing and diametrically expanding the rubber boot 619, and resultantly securing the panels 657, 660 together.

As body panels for an ATV are typically manufactured (e.g., molded) within certain tolerances, a body panel can be slightly larger or smaller than optimally desired, yet still fall within an acceptable tolerance limit. Accordingly, mounting apertures (e.g., for bolts) provided in body panels are often elongated to accommodate for tolerance variations. Variations in a body panel's dimensions within the tolerance range are often not visible to an onlooker of the vehicle. However, these variations can be noticeable, particularly when respective body panels meet at an irregular interface due to one or both of the body panels having dimensions approaching a tolerance limit.

One interface between respective body panels on the ATV 40 is shown to be provided near the center of the ATV 40 (i.e., at the midpoint fastener 118 shown in FIG. 20) where the front fender assembly 46 meets the rear fender assembly 56, as described below. Each of the front and rear fender assemblies 46, 56 can be attached to the frame 41 of the ATV 40 at this interface. Since the location of this interface might be a common focal point of the ATV 40, substantially no irregularity in this interface may be acceptable. As such, and in order that the ATV 40 may consistently display an image of quality and durability, it can be important that minimal variation/irregularity is provided between the front and rear fender assemblies 46, 56 at this interface. To the extent that either of the front and/or rear fender assemblies 46, 56 approaches a tolerance limit, any variations can be accommodated by adjustable fastener arrangements (e.g., involving elongated apertures in the body panels) provided adjacent to respective forward and rearward ends 106, 107 of the ATV 40, as described below. In this arrangement, because the interfaces between the front and rear fender assemblies 46, 56 and other parts of the ATV 40 disposed near the forward and rearward ends 106, 107 of the ATV 40 are not particularly prominent to onlookers of the ATV 40, it is unlikely that any variation in tolerance of either of the front or rear fender assemblies 46, 56 would be noticeable by an onlooker of the ATV 40.

Figure 3:
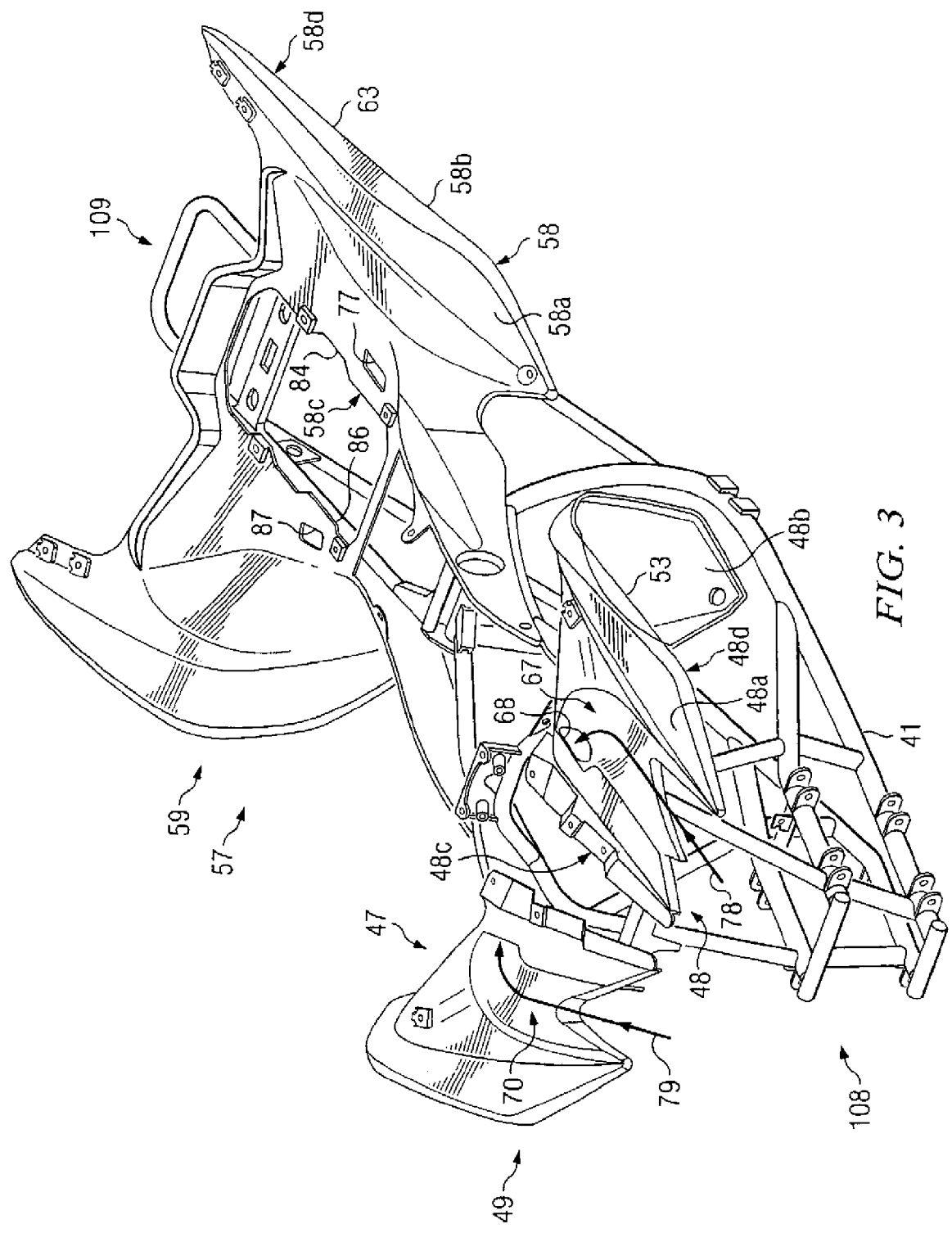
FIG. 3 is a front perspective view depicting the frame, the lower front fender panel, and the lower rear fender panel of the ATV of FIG. 1.
Figure 4:
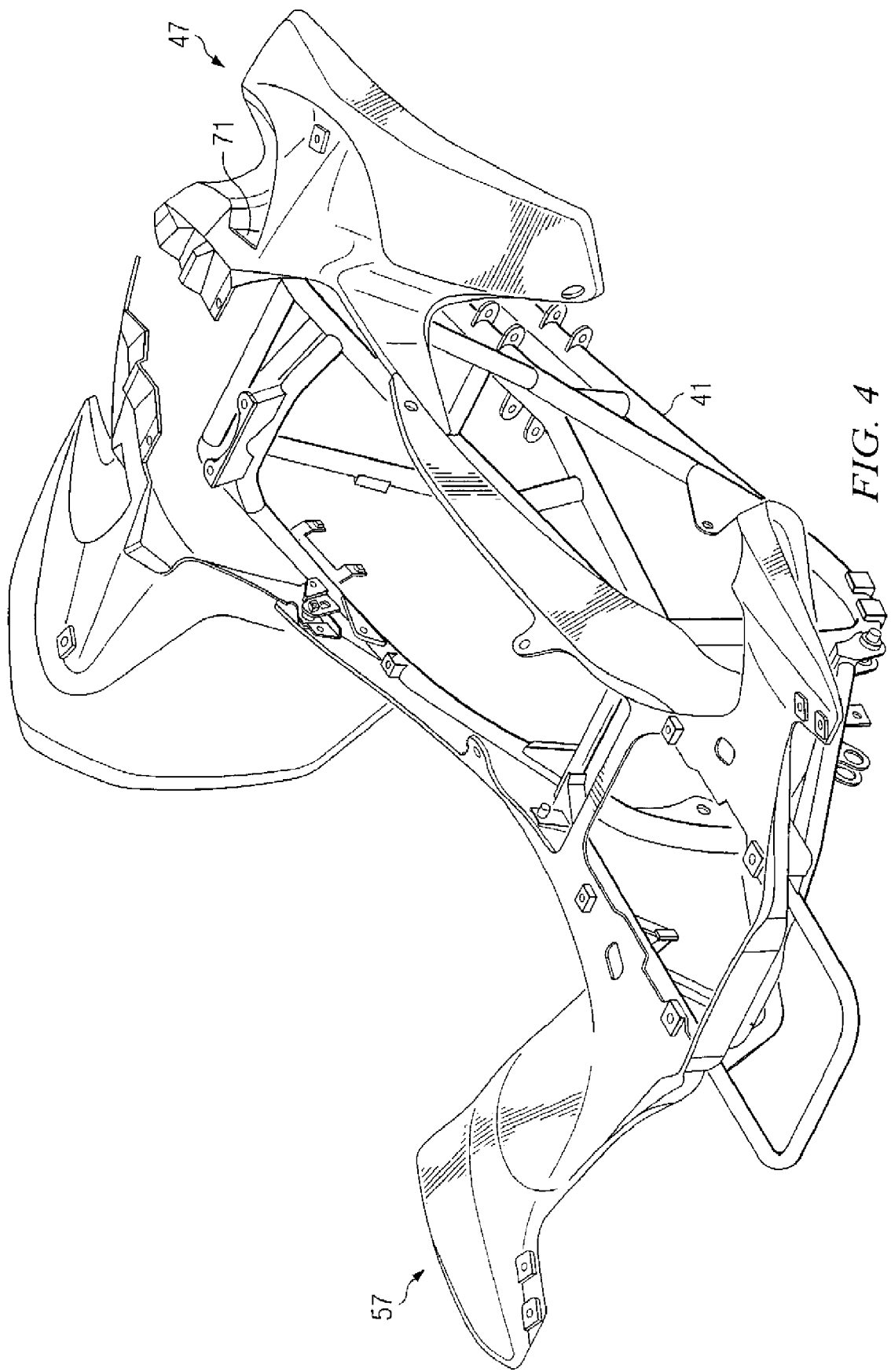
FIG. 4 is a rear perspective view depicting the components of FIG. 3.
Figure 5:
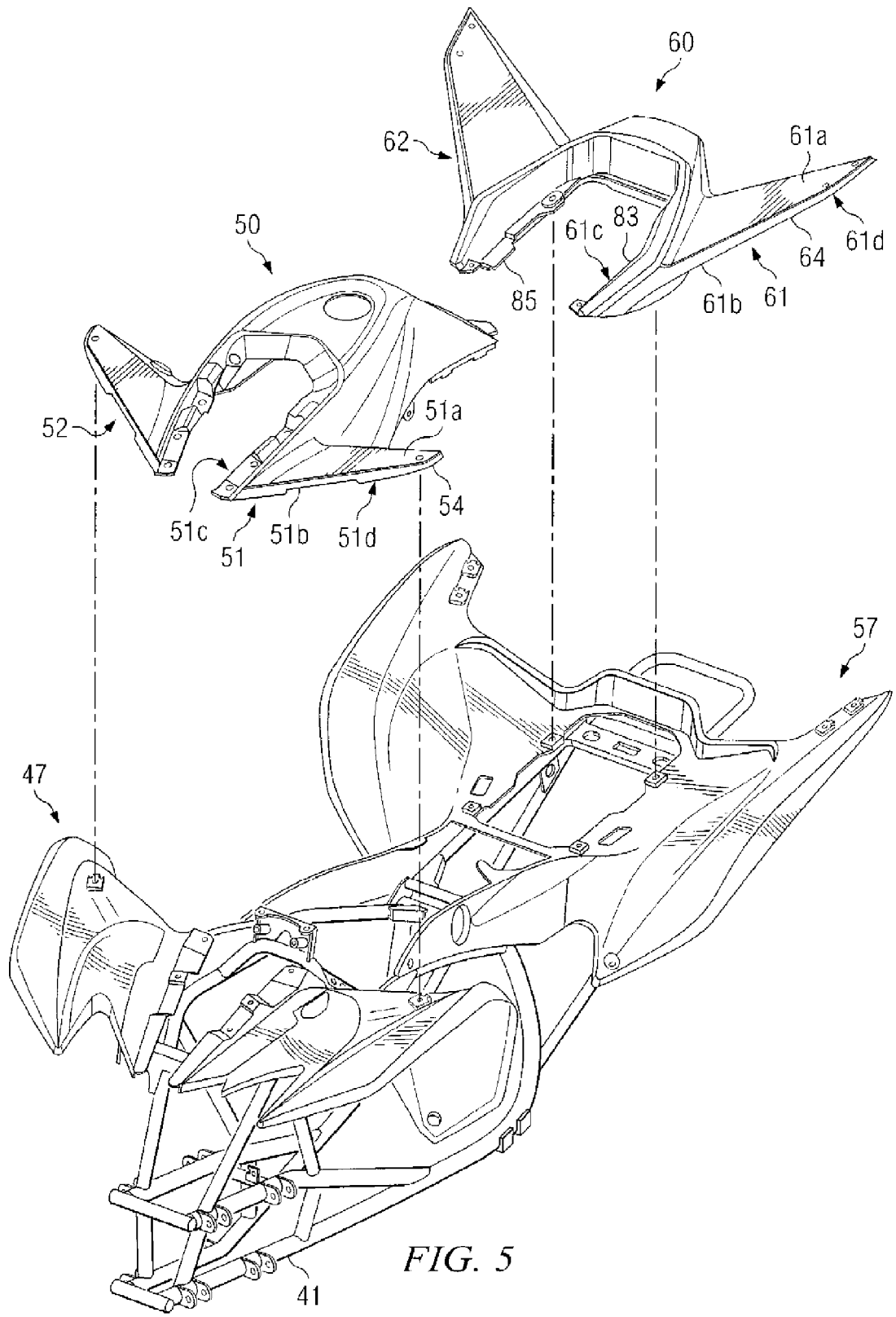
FIG. 5 is a front perspective view depicting the upper front fender panel and the upper rear fender panel of the ATV of FIG. 1 in exploded association with the components of FIGS. 3-4.

In particular, the frame 41 is shown in FIG. 3, for example, to extend from a forward end 108 to a rearward end 109. The frame 41 is shown to comprise forward attachment structures (e.g., 110 in FIG. 6) disposed adjacent to the forward end 108 of the frame 41. The frame 41 is also shown to comprise rearward attachment structures (e.g., 111 in FIG. 26) disposed adjacent to the rearward end 109 of the frame 41. The frame 41 is additionally shown to comprise midpoint attachment structures (e.g., 112 in FIGS. 22-23) disposed about midway between the forward end 108 of the frame 41 and the rearward end 109 of the frame 41.

Figure 24:
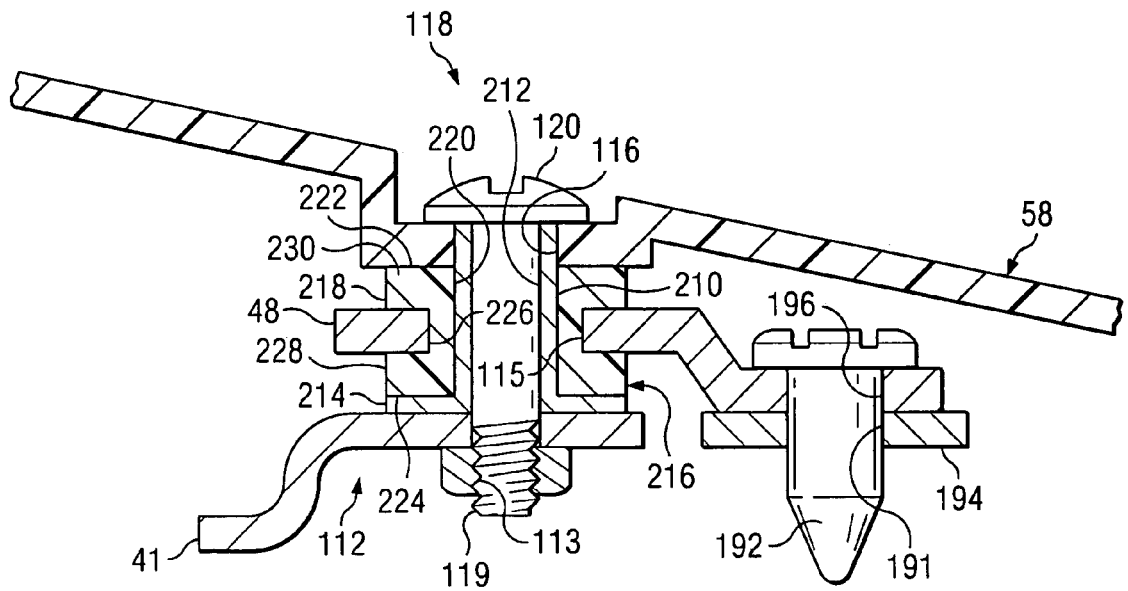
FIG. 24 is a cross-sectional view taken along section lines 24-24 in FIG. 21, wherein the bolt and the push pin are shown in elevation.
Figure 25:
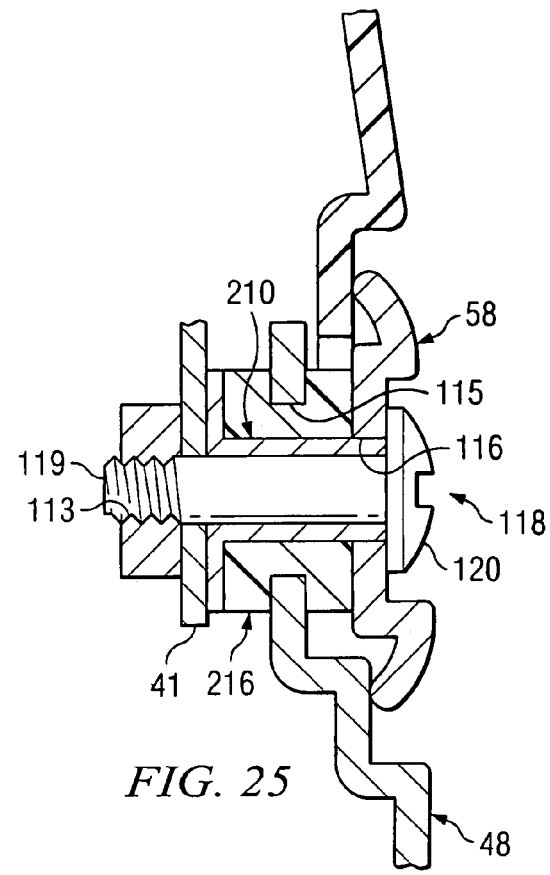
FIG. 25 is a cross-sectional view taken along section lines 25-25 in FIG. 21, wherein the bolt is shown in elevation.
Figure 26:
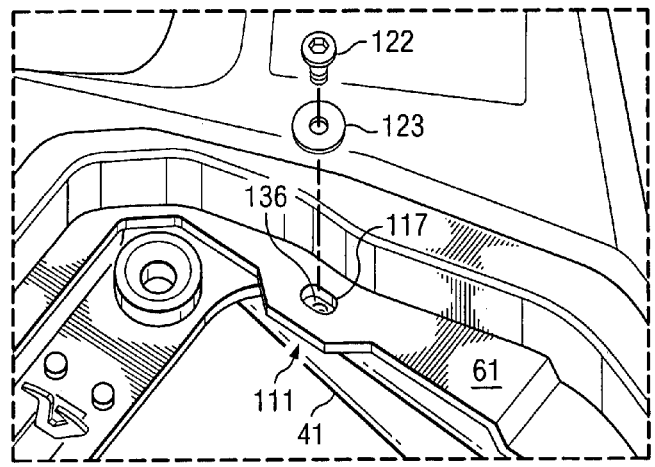
FIG. 26 is a perspective view depicting an enlargement of a portion of FIG. 10, wherein a bolt and collar is shown to be removed.

The front fender assembly 46 is shown to be configured for attachment to each of the forward attachment structure 110 and the midpoint attachment structure 112. The rear fender assembly 56 is shown to be configured for attachment to each of the midpoint attachment structure 112 and the rearward attachment structure 111. As shown in FIGS. 21, 24, and 25, and as described in further detail below, a midpoint fastener 118 (e.g., a threaded bolt) can be inserted into aligning apertures 113, 115, 116 respectively defined by the midpoint attachment structure 112 and by overlapping portions of the front and rear fender assemblies 46, 56 (e.g., left lower front and rear fender portions 48 and 58, respectively) to attach these overlapping portions to the midpoint attachment structure 112. In one embodiment, as shown in FIGS. 24 and 25, the aperture 113 in the midpoint attachment structure 112 comprises a threaded aperture which is configured to receive a threaded end of the midpoint fastener 118. In the embodiment depicted in FIGS. 24 and 25, for example, the aligning apertures 115 and 116 defined by the front fender assembly 46 and the rear fender assembly 56 are shown to be substantially round so as to allow little, if any, variability in terms of positioning of a forward end of the rear fender assembly 56 with respect to a rearward end of the front fender assembly 46. In one embodiment, and with reference to FIGS. 2 and 20, the aligning apertures 115, 116, and 113 and the midpoint fastener 118 can be disposed at a location vertically beneath a lowermost portion of the seat 96, and at a location horizontally forward of a forwardmost portion of the seat 96. However, it will be appreciated that these features might be located in any of a variety of suitable configurations and arrangements on a vehicle.

Also, while the midpoint fastener 118 is depicted for attachment of the front fender assembly 46 and the rear fender assembly 56 on the left side of the ATV 40, it will be appreciated that another midpoint fastener might be provided for similarly attaching the front fender assembly 46 and the rear fender assembly 56 on the right side of the ATV 40. In particular, the midpoint fastener can comprise a left midpoint fastener (e.g., 118) and a right midpoint fastener which are correspondingly disposed upon opposite sides of the ATV 40, wherein the left midpoint fastener (e.g., 118) is inserted into the respective aligning apertures (e.g., 115, 116, 113) defined by left portions of each of the front fender assembly (e.g., 46), the rear fender assembly (e.g., 56), and the midpoint attachment structure (e.g., 112), and wherein the right midpoint fastener is inserted into respective aligning apertures defined by right portions of each of the front fender assembly (e.g., 46), the rear fender assembly (e.g., 56), and the midpoint attachment structure (e.g., 112).

In this configuration, the interface between the forward end of the rear fender assembly 56 and the rearward end of the front fender assembly 46 can be substantially uniform or tight, and any variability in the dimensions of the front and rear fender assemblies 46, 56 can be accounted for at respective forward and rearward ends 108, 109 of the frame 41, at which locations the front and rear fender assemblies 46, 56 typically are not expected to tightly interface with other body components, and slight variations in fit (e.g., arising from irregularity during molding of the fender assemblies) are not likely to be noticeable. In order to provide this flexibility, the forward end of the front fender assembly 46 can be provided with elongated slotted apertures (e.g., 114 in FIG. 6), and the rearward end of the rear fender assembly 56 can be provided with elongated slotted apertures (e.g., 117 in FIG. 26). Fasteners (e.g., a bolt 121 in FIG. 6) can pass through the elongated slotted apertures (e.g., 114 in FIG. 6) in the front fender assembly 46 and into threaded apertures in the forward attachment structure 110 of the frame 41. Likewise, fasteners (e.g., a bolt 122 in FIGS. 10, 12 and 26) can pass through the elongated slotted apertures (e.g., 117 in FIG. 26) in the rear fender assembly 56 and into threaded apertures (e.g., 136 in FIG. 26) in the rearward attachment structure 111 of the frame 41. The midpoint fastener 118 accordingly provides a datum to facilitate a consistent interface between the front fender assembly 46 and the rear fender assembly 56 such that tolerance variability in at least one of the front fender assembly 46 and the rear fender assembly 56 results in variation in attachment to at least one of the forward attachment structure 110 and the rearward attachment structure 111 (instead of to the midpoint attachment structure 112).

The midpoint fasteners (e.g., 118) can be provided in any of a variety of suitable configurations for attaching respective portions of the front and rear fender assemblies 46, 56 to the frame 41. For example, in one particular embodiment, as shown in FIGS. 21-25, the midpoint fastener 118 is shown to comprise a bolt having a head 120 and a threaded end 119. A grommet 216 is shown to surround a portion of the midpoint fastener 118. The grommet 216 can be disposed between the front fender assembly 46 (e.g., the left lower front fender portion 48) and the rear fender assembly 56 (e.g., the left lower rear fender portion 58) to prevent the front fender assembly 46 from contacting the rear fender assembly 56 adjacent to the midpoint fastener 118. By preventing such contact, the grommet 216 prevents abrasion to the respective front and rear fender assemblies 46, 56 resulting from contact of the front and rear fender assemblies 46, 56. The grommet 216 can also be disposed between each of the front and rear fender assemblies 46, 56 and the frame 41 to prevent each of the front and rear fender assemblies 46, 56 from contacting the frame 41. In this configuration, heat from the frame 41 (e.g., initially radiated from the ATV's engine) is less likely to be conducted to the front and rear fender assemblies 46, 56, and warping and discoloration of the front and rear fender assemblies 46, 56 can accordingly be prevented. Accordingly, in the fastening arrangement of FIGS. 21-25, portions of both the front and rear fender assemblies 46, 56 can be attached to common locations of the frame 41, but without contacting each other or the frame 41.

In accordance with one embodiment, as shown in FIGS. 22-25, the grommet 216 can have an exterior surface 218 and can define a bore 220 extending longitudinally from a first end 222 to a second end 224. The midpoint fastener 118 can pass through the bore 220, as shown in FIGS. 24-25. The exterior surface 218 can define an annular channel 226 having a reduced diameter as compared to longitudinally adjacent annular portions 228, 230 of the grommet 216 disposed upon opposite sides of the annular channel 226. One of the longitudinally adjacent annular portions (i.e., 230) is shown to define the first end 222, while the other of the longitudinally adjacent annular portions (i.e., 228) is shown to define the second end 224. The grommet 216 can be disposed, as in FIGS. 22-25, such that the aperture 115 in the front fender assembly 46 surrounds the annular channel 226, and such that a portion of the front fender assembly 46 (e.g., a portion of the left lower front fender portion 48) is retained within the annular channel 226. In one embodiment, as shown in FIGS. 22-25, the first end 222 of the grommet 216 can contact the rear fender assembly 56 (e.g., a portion of the left lower rear fender portion 58) adjacent to the aperture 116 in the rear fender assembly 56. Though the grommet 216 can comprise any of a variety of materials, in one embodiment, the grommet 216 can comprise a resilient material such as rubber.

In one embodiment, a sleeve 210 can be provided within the bore 220 of the grommet 216 such that the bore 220 surrounds the sleeve 210. The sleeve 210 can define a longitudinally extending bore 212. As shown in FIGS. 24-25, the midpoint fastener 118 can pass through the bore 212 in the sleeve 210 such that the sleeve 210 surrounds a portion of the midpoint fastener 118 and is disposed between the grommet 216 and the midpoint fastener 118. In this embodiment, the midpoint fastener 118 is configured to compress the grommet 216 between the rear fender assembly 56 and the midpoint attachment structure 112 of the frame 41.

The sleeve 210 can be positioned and configured so as to limit compression of the grommet 216 by the midpoint fastener 118. In one embodiment, as shown in FIGS. 24-25, the sleeve 210 can contact the midpoint attachment structure 112 of the frame 41 and can additionally extend into the aperture 116 in the rear fender assembly 56 for contacting the head 120 of the midpoint fastener 118 upon tightening of the midpoint fastener 118. The head 120 can also contact the rear fender assembly 56 as shown in FIGS. 24-25. As also shown in FIGS. 24-25, the sleeve 210 can comprise a radially extended portion 214 for contacting and distributing force across a larger surface area of the midpoint attachment structure 112 of the frame 41. In such circumstance, the second end 224 of the grommet 216 can contact the radially extended portion 214 such that the grommet 216 is compressed between the rear fender assembly 56 and the radially extended portion 214 of the sleeve 210. Though the sleeve 210 can comprise any of a variety of materials, in one embodiment, the sleeve 210 can comprise metal such as stainless steel. In addition to limiting compression as described above, the sleeve 210 can also serve to help prevent transfer of heat from the frame 41 and/or midpoint fastener 118 to the front and rear fender assemblies 46, 56. It will be appreciated that, in other embodiments, the positions of the front and rear fender assemblies 46, 56 may be reversed with respect to the midpoint fastener 118, the grommet 216 and/or the sleeve 210.

Figure 20:
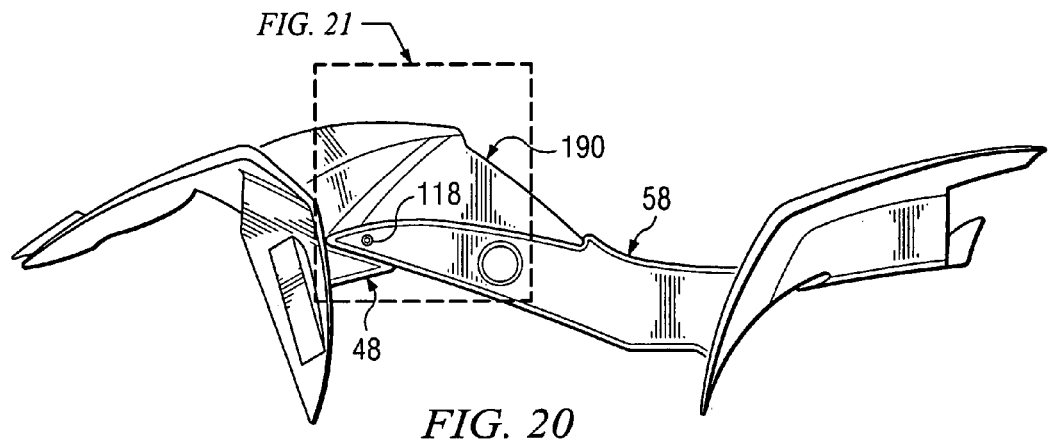
FIG. 20 is a side elevational view depicting selected components of the ATV of FIGS. 1-2.
Figure 21:
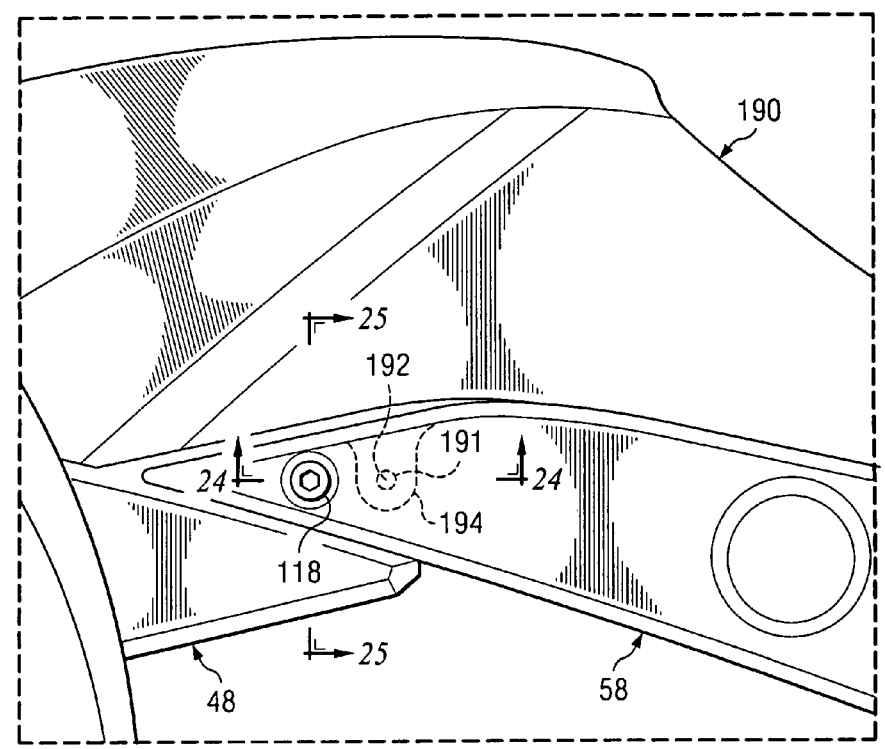
FIG. 21 is a side elevational view depicting an enlargement of a portion of FIG. 20.
Figure 22:
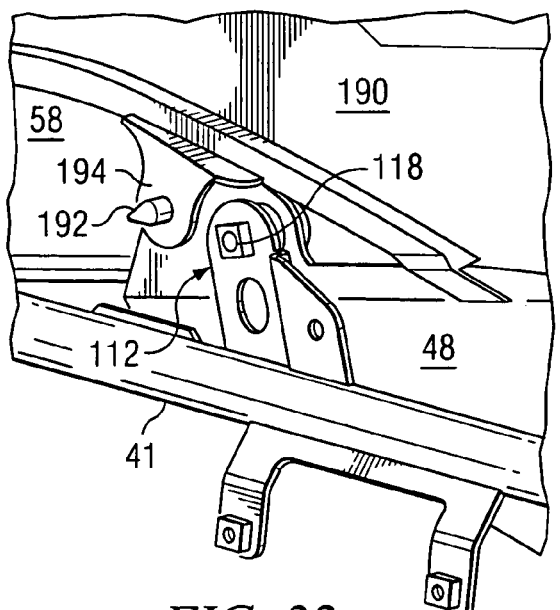
FIG. 22 is a rear perspective view depicting the components of FIG. 20 in association with a portion of a frame.
Figure 23:
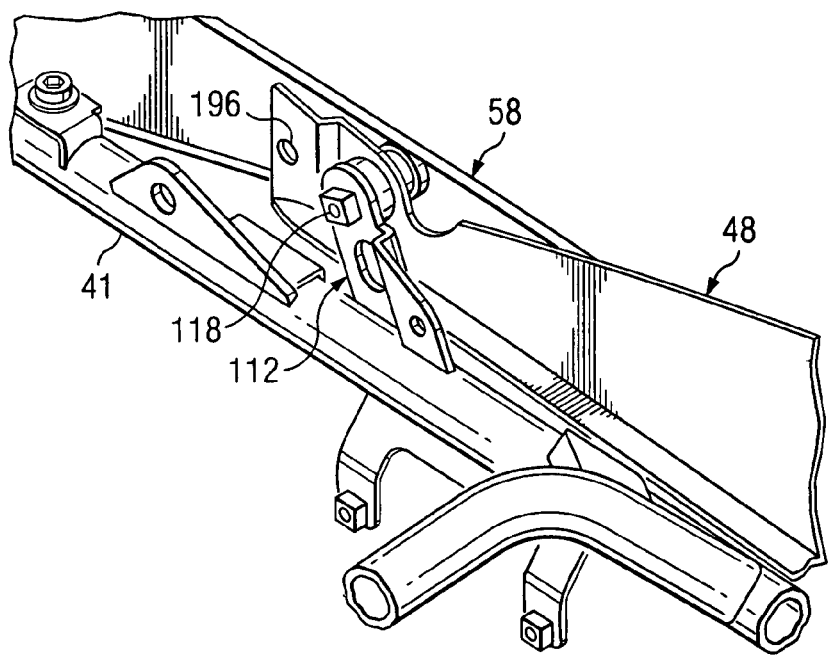
FIG. 23 is a rear perspective view depicting the components of FIG. 22 wherein the fuel tank cover has been removed for clarity of illustration.

A fuel tank cover 190 is shown in FIGS. 20-22 to comprise a body panel which is disposed adjacent to the left lower rear fender portion 58 and the left lower front fender portion 48. In one embodiment, the fuel tank cover can be integrally provided by the upper front fender panel 50. However, in another embodiment, the fuel tank cover can be provided as a separate component from the upper front fender panel 50. In either circumstance, the fuel tank cover 190 can comprise a tab 194 which defines an aperture 191. A fastener (e.g., a push pin 192) can be inserted through the aperture 191 and through an aperture 196 (FIG. 23) in a portion of the left lower front fender portion 48 to facilitate an indirect attachment of the fuel tank cover 190 to the midpoint attachment structure 112 of the frame 41. In particular, the push pin 192 is shown to be located adjacent to the midpoint fastener 118 such that the fuel tank cover 190 is indirectly attached to the frame 41 by way of the midpoint fastener 118 and the left lower front fender portion 48. In one embodiment, as shown in FIG. 21, the push pin 192 can be concealed from view by the left lower rear fender portion 58. In another embodiment, a fuel tank cover might additionally or alternatively be attached with one or more push pins or other fasteners to one or more components of the ATV 40 other than the left lower front fender portion 48.

Figure 29:
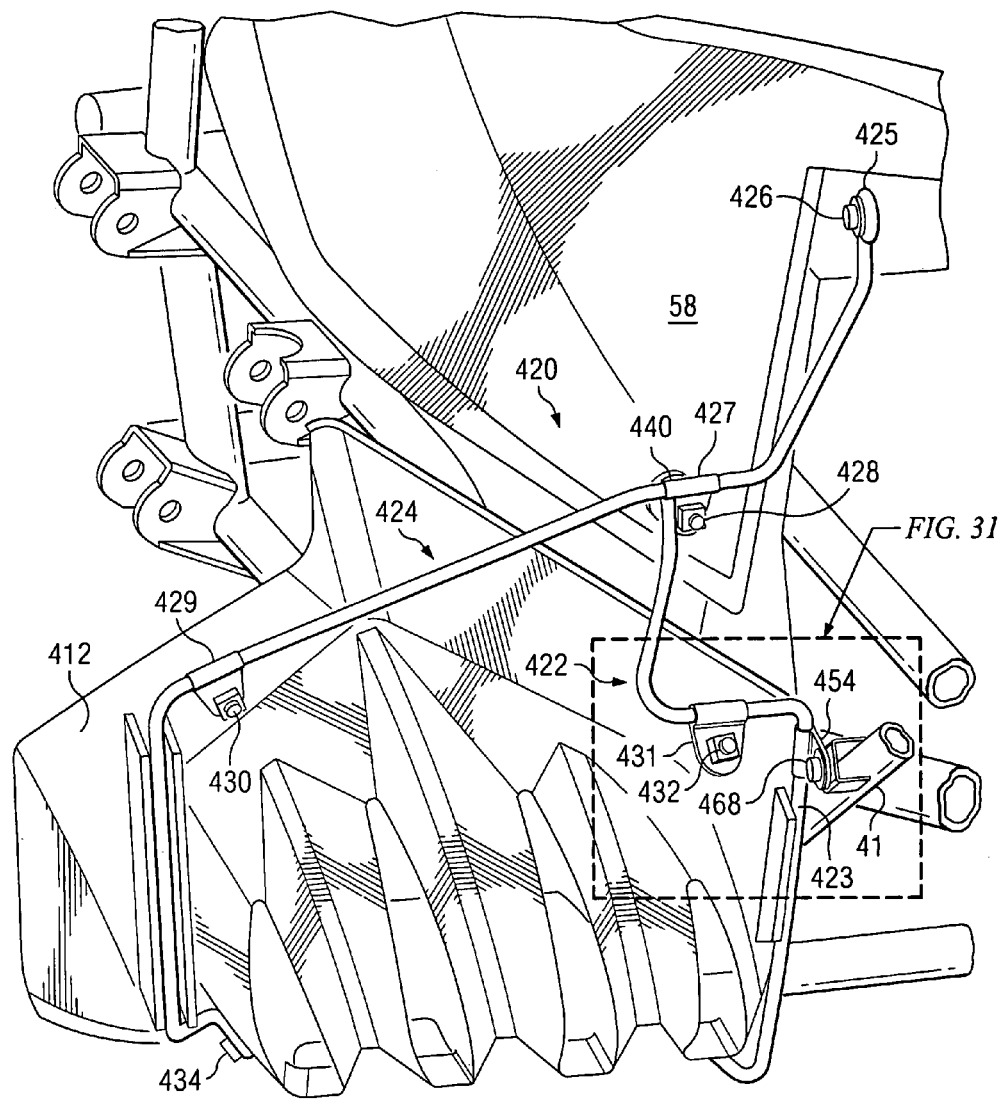
FIG. 29 is a perspective view depicting selected components of the ATV of FIGS. 1-2.
Figure 30:
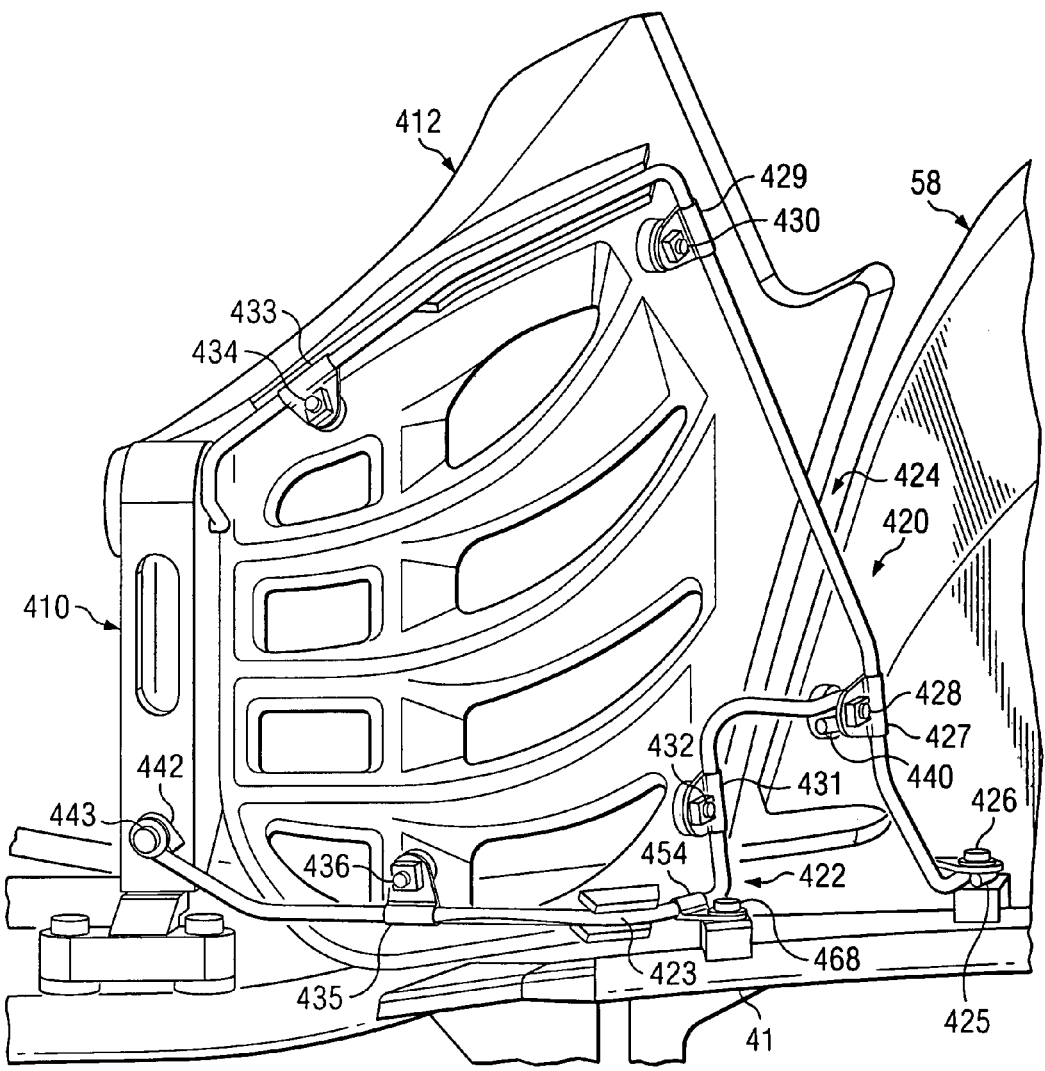
FIG. 30 is a bottom plan view depicting the components of FIG. 29.

The rear fender assembly 56 can be supported with respect to the frame 41 through use of fewer elongated metal wire stays than are present upon conventional ATVs for supporting fenders. However, a limited number of elongated metal wire stays might be provided in some circumstances to support portions of the rear fender assembly 56. In particular, as shown in FIGS. 29-30, the lowermost portion of the left lower rear fender portion 58 can be supported by a stay assembly 420 with respect to the frame 41 and with respect to an adjacent mudguard 412 and footrest 410. A similar arrangement can be provided upon a right side of the ATV 40.

In particular, as shown in FIGS. 29-30, it can be seen that the stay assembly 420 can comprise two elongated metal wires 422 and 424. Although it is contemplated that the elongated metal wires 422, 424 can be formed from spring-type steel, it will be appreciated that the elongated metal wires 422, 424 might alternatively be formed from some other material(s). Each of the elongated metal wires 422, 424 are shown to be attached to each of the frame 41, the left lower rear fender portion 58, the footrest 410, and the mudguard 412. In other embodiments, it will be appreciated that a stay assembly might comprise only a single elongated metal wire, or might alternatively comprise more than two elongated metal wires.

Each of the elongated metal wires 422, 424 are shown to be attached to the left lower rear fender portion 58 at a common location. In particular, a bolt 428 is shown to be provided for passage through an aperture in the left lower rear fender portion 58, through an end 440 of the elongated metal wire 422, and into a swivel clip 427 which wraps around a portion of the elongated metal wire 424. In other embodiments, the elongated metal wires of a stay assembly can be attached to a fender portion in alternative configurations (e.g., at different locations).

The elongated metal wires 422, 424 are shown to attach to the frame 41 at differing locations. In particular, the elongated metal wire 424 is shown to have an end 425 which is wrapped around a bolt 426 which can be inserted into a threaded aperture in the frame 41. While this configuration is effective for attaching an end of an elongated metal wire to a frame of a vehicle, it does not provide an effective arrangement for attaching a middle portion of an elongated metal wire to a frame, as it would require overly complex bending of the elongated metal wire and would facilitate insufficient flexibility of movement by the attached components. An attempt to weld a mounting bracket to a middle portion of an elongated metal wire can result in disadvantageously affecting the resiliency and tensile strength of the elongated metal wire.

As such, the elongated metal wire 422 is shown to be attached to the frame 41 through use of a swivel clip 454 which surrounds a longitudinal portion 423 of the elongated metal wire 422. As described in further detail below, the swivel clip 454 can facilitate attachment of the elongated metal wire 422 to the frame 41, but can also facilitate at least some movement of the elongated metal wire 422 with respect to the frame 41. The elongated metal wire 422 is shown to be attached to the left lower rear fender portion 58 and the mudguard 412 on opposite sides of the longitudinal portion 423 of the elongated metal wire 422. The elongated metal wire 422 is also shown to be attached to the mudguard 412 on opposite sides of the longitudinal portion 423 of the elongated metal wire 422. The swivel clip 454 can be attached to the frame 41 through use of a bolt 468, for example. In other embodiments, respective elongated metal wires may be attached to a frame in any of a variety of alternative configurations.

The elongated metal wires 422, 424 are shown to be attached to the mudguard 412 at differing locations. In particular, the elongated metal wire 424 is shown to be attached to the mudguard 412 with bolts 430, 434 inserted through apertures in the mudguard 412 and into respective swivel clips 429, 433. The elongated metal wire 422 is shown to be attached to the mudguard 412 with bolts 432, 436 inserted through apertures in the mudguard 412 and into respective swivel clips 431, 435. In other embodiments, respective elongated metal wires may be attached to a mudguard in any of a variety of alternative configurations for at least partially supporting the mudguard with respect to a footrest, frame, and rear fender assembly of an ATV.

The elongated metal wires 422, 424 are shown to be attached to the footrest 410 at differing locations. In particular, an end of the elongated metal wire 424 is shown to be inserted into an aperture in the footrest 410 for securement to the footrest 410. An end 442 of the elongated metal wire 422 is shown to be wrapped around a bolt 443 which can be inserted into a threaded aperture in the footrest 410. In other embodiments, respective elongated metal wires may be attached to a footrest in any of a variety of alternative configurations.

Figure 33:
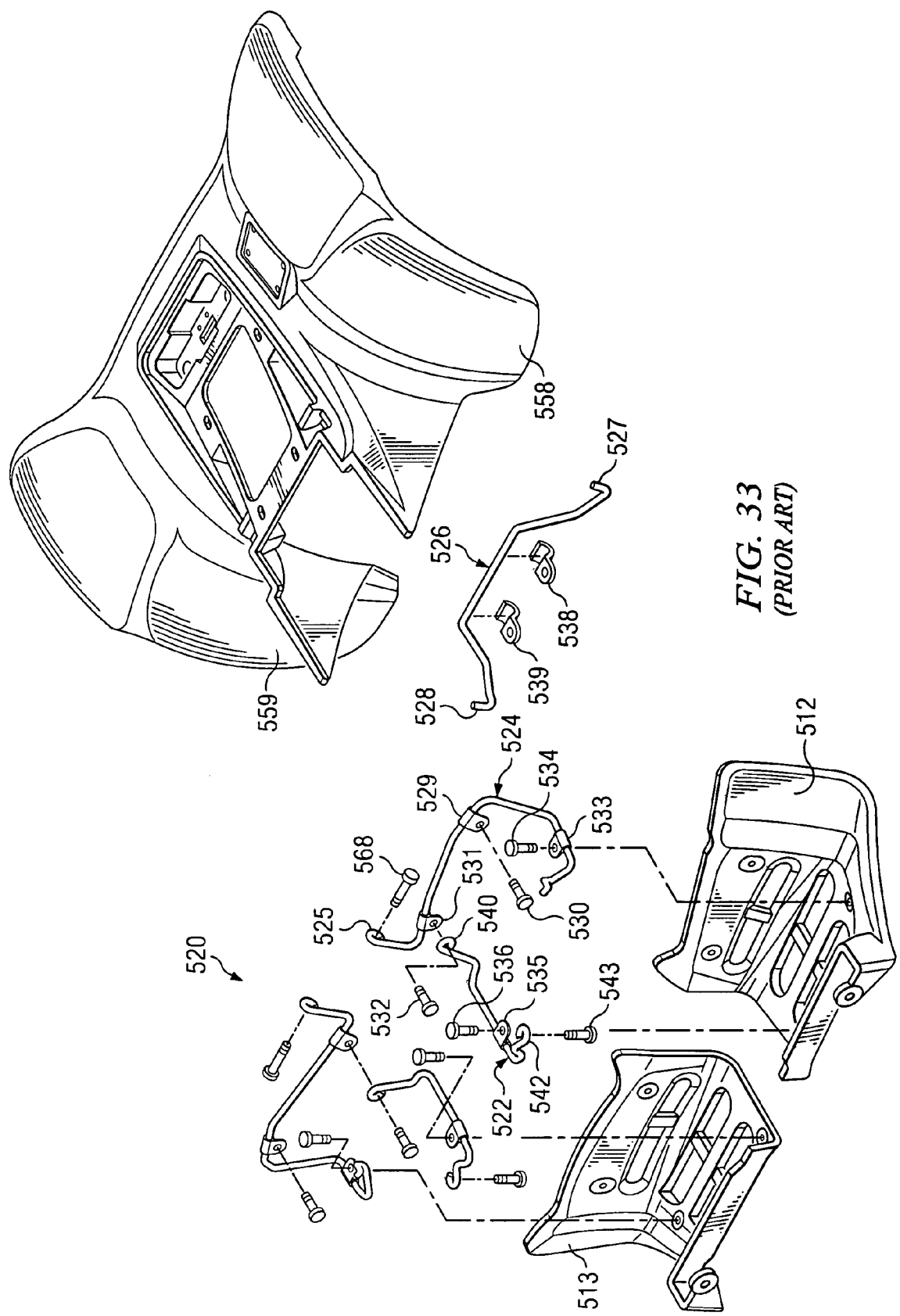
FIG. 33 is an exploded perspective view depicting a conventional rear fender assembly, mudguards, and certain other components such as provided upon a conventional ATV.

It can be seen that the stay assembly 420, and in particular the elongated metal wires 422, 424, can be configured to facilitate consistent spacing between the mudguard 412 and the left lower rear fender portion 58 of the rear fender assembly 56. As such, during use of the ATV 40, the position of the mudguard 412 is unlikely to move significantly with respect to the rear fender assembly 56, and debris is less likely to be caught within a gap between the mudguard 412 and the left lower rear fender portion 58 of the rear fender assembly 56 (e.g., as compared to a conventional ATV having the arrangement depicted in FIG. 33).

Figure 31:
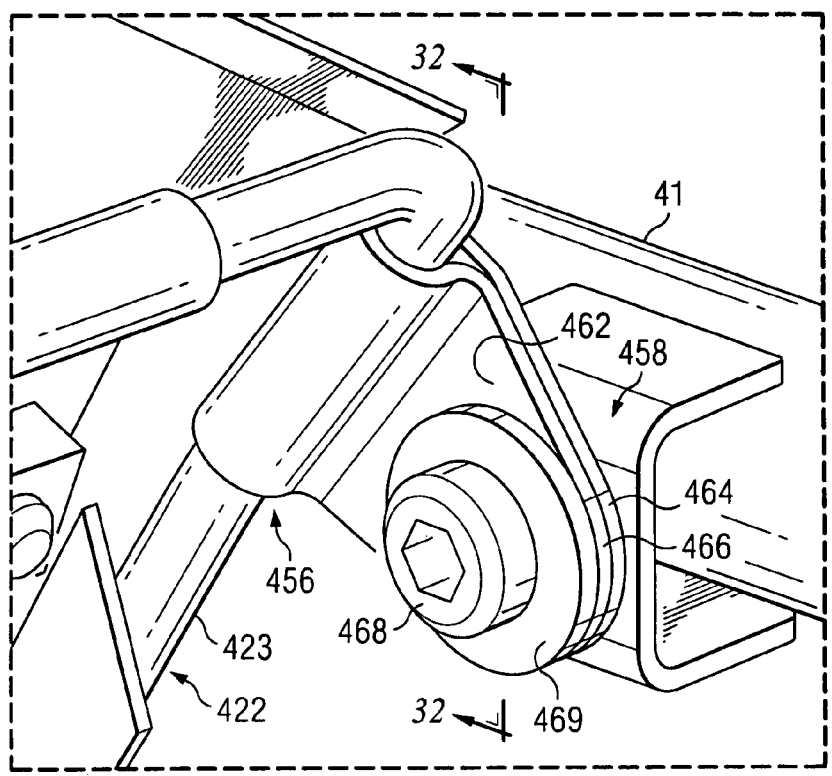
FIG. 31 a perspective view depicting an enlargement of a portion of FIG. 29.
Figure 32:
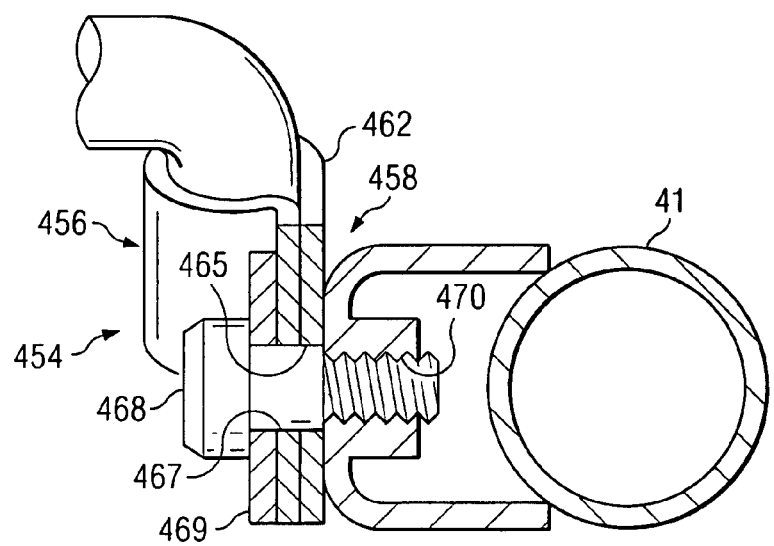
FIG. 32 is a cross-sectional view taken along section lines 32-32 in FIG. 31, wherein the bolt is shown in elevation.

As previously indicated, and as shown in further detail in FIGS. 31-32, the elongated metal wire 422 is shown to be attached to the frame 41 through use of a swivel clip 454. The swivel clip 454 is shown to comprise a retention portion 456 and a mounting portion 458. In one embodiment, the swivel clip 454 can comprise a ribbon 462 which is formed from metal or some other material(s). The ribbon 462 can extend from a first end 464 to a second end 466. A portion of the ribbon 462 (e.g., the retention portion 456) can at least partially surround the longitudinal portion 423 of the elongated metal wire 422 such that the first end 464 overlaps the second end 466. The retention portion 456 is shown to be located about midway along the ribbon 462 between the first end 464 and the second end 466.

Once overlapped in this manner, and as shown in FIGS. 31-32, the first and second ends 464, 466 can be attached to the frame 41 such that the elongated metal wire 422 is movably attached to the frame 41 by the ribbon 462. In particular, the mounting portion 458 of the ribbon 462 can include the first end 464 of the ribbon 462 which defines an aperture 465, and the second end 466 of the ribbon 462 which defines an aperture 467. The frame 41 can define a threaded aperture 470. The bolt 468 can pass through a washer 469, through the apertures 465, 467, and then into the threaded aperture 470 to facilitate attachment of the swivel clip 454 to the frame 41.

It will be appreciated that this movable attachment of the elongated metal wire 422 to the frame 41 by the swivel clip 454 can involve at least some rotation of the longitudinal portion 423 with respect to the frame 41 and/or at least some longitudinal motion of the longitudinal portion 423 with respect to the frame 41. By allowing some movement of the longitudinal portion 423 with respect to the frame 41, it will be appreciated that the swivel clip 454 reduces the amount of bending or other force which might otherwise be imposed upon the rear fender assembly 56 and/or the footrest 410 if the longitudinal portion 423 were rigidly secured to the frame 41.

To attach a lowermost end of the left lower rear fender portion 58 to the frame 41 of the ATV 40, the elongated metal wire 422 can be attached to the left lower rear fender portion 58 and to the mudguard 412 on opposite sides of the longitudinal portion 423 of the elongated metal wire 422, as shown in FIGS. 29-30. The elongated metal wire 422 can also be attached to the mudguard 412 on opposite sides of the longitudinal portion 423 of the elongated metal wire 422, as also shown in FIGS. 29-30. The ribbon 462 can be wrapped at least partially around the longitudinal portion 423 of the elongated metal wire 422 such that the respective apertures 465, 467 in the first and second ends 464, 466 of the ribbon 462 are aligned. The bolt 468 can then be inserted through the apertures 465, 467 in the ribbon 462 and into the threaded aperture 470 provided in the frame 41 of the ATV 40 to facilitate movable attachment of the elongated metal wire 422 with respect to the frame 41 of the ATV 40.

It will be appreciated that fender panels can be provided for a vehicle such as an ATV in any of a variety of other suitable configurations. For example, in one alternative embodiment, as shown in FIGS. 36, 36a, 37, 38, and 38a, an ATV can include a frame 741 and front and rear fender assemblies 746, 756 provided in an overlapping arrangement. In particular, the front fender assembly 746 is shown to comprise a lower front fender panel 747 and an upper front fender panel 750. The lower front fender panel 747 is shown to extend to an outer perimeter 753, and the upper front fender panel 750 is shown to extend to an outer perimeter 754. The lower front fender panel 747 is shown to comprise a left lower front fender portion 748 and a right lower front fender portion 749, and to have a top surface 748a and a bottom surface 748b. The upper front fender panel 750 is shown to comprise a left upper front fender portion 751 and a right upper front fender portion 752, and to have a top surface 751a and a bottom surface 751b. Both the lower and upper front fender panels 747 and 750 can together provide a fender for left and right front wheels of an ATV, can each receive contact from debris thrown from the left and right front wheels, and can also each serve as a decorative body panel, such as described above with respect to the embodiment of FIGS. 1-12 and 14-32.

The rear fender assembly 756 is shown to comprise a lower rear fender panel 757 and an upper rear fender panel 760. The lower rear fender panel 757 is shown to extend to an outer perimeter 763, and the upper rear fender panel 760 is shown to extend to an outer perimeter 764. The lower rear fender panel 757 is shown to comprise a left lower rear fender portion 758 and a right lower rear fender portion 759, and to have a top surface 758a and a bottom surface 758b. The upper rear fender panel 760 is shown to comprise a left upper rear fender portion 761 and a right upper rear fender portion 762, and to have a top surface 761a and a bottom surface 761b. Similar to the arrangement described above with respect to FIGS. 1-12 and 14-32, both the lower and upper rear fender panels 757 and 760 can together provide a fender for left and right rear wheels of an ATV, can each receive contact from debris thrown from the left and right rear wheels, and can also each serve as a decorative body panel. Channels are shown in FIGS. 36, 36a, 37, 38, and 38a to be provided in the front and rear fender assemblies 746 and 756 to facilitate passage of fluid along one or more predetermined pathways, such as described above with respect to the embodiment of FIGS. 1-12 and 14-32. Some or all of the other features described above with respect to the embodiment of FIGS. 1-12 and 14-32 may also be provided in the embodiment of FIGS. 36, 36a, 37, 38, and 38a, some of which are depicted in FIGS. 36, 36a, 37, 38, and 38a.

While many of the foregoing features involve respective fender panels, it will be appreciated that other embodiments might involve other types of respective panels which may or may not comprise body panels such as might be provided upon a vehicle.

The foregoing description of embodiments and examples has been presented for purposes of illustration and description. It is not intended to be exhaustive or to limit the invention to the forms described. Numerous modifications are possible in light of the above teachings. Some of those modifications have been discussed, and others will be understood by those skilled in the art. The embodiments were chosen and described in order to best illustrate various embodiments as are suited to the particular use contemplated. It is hereby intended that the scope of the invention be defined by the claims appended hereto.

What is claimed is:

1. An all terrain vehicle comprising:
   a frame;
   a rear wheel supported with respect to the frame;
   a fender assembly extending at least partially over the rear wheel;
   a footrest;
   a mudguard; and
   a stay assembly comprising a first elongated metal wire and a second elongated metal wire, wherein each of the first elongated metal wire and the second elongated metal wire are attached to each of the frame, the fender assembly, the footrest, and the mudguard.

2. The all terrain vehicle of claim 1 wherein the stay assembly is configured to facilitate consistent spacing between the mudguard and the fender assembly.

3. The all terrain vehicle of claim 1 wherein each of the first elongated metal wire and the second elongated metal wire is attached to the fender assembly at a common location, each of the first elongated metal wire and the second elongated metal wire is attached to the frame at differing locations, each of the first elongated metal wire and the second elongated metal wire is attached to the mudguard at differing locations, and each of the first elongated metal wire and the second elongated metal wire is attached to the footrest at differing locations.

4. The all terrain vehicle of claim 1 wherein at least one of the first elongated metal wire and the second elongated metal wire is movably attached to the frame through use of a swivel clip.

5. An all terrain vehicle comprising:
a frame;
a fender assembly;
a mudguard spaced apart from the fender assembly; and
an elongated metal wire attached to each of the frame, the fender assembly and the mudguard, wherein the elongated metal wire is attached to the mudguard and the fender assembly at differing locations and is configured to facilitate consistent spacing between the mudguard and the fender assembly.

6. The all terrain vehicle of claim 5 further comprising:
a swivel clip comprising a retention portion and a mounting portion; wherein
the elongated metal wire comprises a first end, a second end and a longitudinal portion intermediate the first and second ends;
the elongated metal wire is movably attached to the frame with the swivel clip;
the retention portion at least partially surrounds the longitudinal portion; and
the mounting portion is fastened to the frame.

7. The all terrain vehicle of claim 5 wherein the elongated metal wire is attached to a footrest.

8. The all terrain vehicle of claim 5 further comprising rear wheels supported with respect to the frame, wherein the fender assembly extends at least partially over at least one of the rear wheels.

9. An all terrain vehicle comprising:
a frame;
a fender assembly;
a mudguard; and
a stay assembly comprising a first elongated metal wire and a second elongated metal wire, each of the first elongated metal wire and the second elongated metal wire being attached to each of the frame, the fender assembly, and the mudguard; wherein
at least one of the first elongated metal wire and the second elongated metal wire is movably attached to the frame; and
each of the first elongated metal wire and the second elongated metal wire is attached to a footrest.

10. The all terrain vehicle of claim 9 wherein each of the first elongated metal wire and the second elongated metal wire is attached to the frame of differing locations.

11. The all terrain vehicle of claim 9 wherein at least one of the first elongated metal wire and the second elongated metal wire is attached to the frame though use of a swivel clip.

12. The all terrain vehicle of claim 9 wherein each of the first elongated metal wire and the second elongated metal wire is attached to the fender assembly at a common location.

13. The all terrain vehicle of claim 9 wherein each of the first elongated metal wire and the second elongated metal wire is attached to the mudguard at differing locations.

14. The all terrain vehicle of claim 9 wherein the stay assembly is configured to facilitate consistent spacing between the mudguard and the fender assembly.

15. The all terrain vehicle of claim 9 further comprising rear wheels supported with respect to the frame, wherein the fender assembly extends at least partially over at least one of the rear wheels.

16. An all terrain vehicle comprising:
a frame;
a fender assembly;
a mudguard;
a stay assembly comprising a first elongated metal wire and a second elongated metal wire, each of the first elongated metal wire and the second elongated metal wire being attached to each of the frame, the fender assembly and the mudguard; and
a first swivel clip; wherein
at least one of the first elongated metal wire and the second elongated metal wire is movably attached to the frame;
the first elongated metal wire comprises a first end, a second end and a longitudinal portion intermediate the first and second ends; and
the longitudinal portion of the first elongated metal wire is movably attached to the frame with the first swivel clip.

17. The all terrain vehicle of claim 16 further comprising:
a second swivel clip; wherein
the first elongated metal wire is attached to the mudguard with at least the second swivel clip; and
the first end of the first elongated metal wire is fastened to the fender assembly.

18. The all terrain vehicle of claim 17 further comprising:
a footrest; and
third and fourth swivel clips; wherein
the second end of the first elongated metal wire is fastened to the footrest;
the second elongated metal wire comprises a first end fastened to the frame and a second end fastened to the footrest; and
the second elongated metal wire is attached to the fender assembly with at least the third swivel clip and is attached to the mudguard with at least the fourth swivel clip.

* * * * *